(12) United States Patent
Olgun

(10) Patent No.: US 11,115,074 B1
(45) Date of Patent: Sep. 7, 2021

(54) WEARABLE DEVICE ANTENNA

(71) Applicant: Ugur Olgun, Venice, CA (US)

(72) Inventor: Ugur Olgun, Venice, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/448,119

(22) Filed: Jun. 21, 2019

Related U.S. Application Data

(60) Provisional application No. 62/694,102, filed on Jul. 5, 2018.

(51) Int. Cl.
| | |
|---|---|
| *H04B 5/00* | (2006.01) |
| *H04B 1/3827* | (2015.01) |
| *H04B 5/02* | (2006.01) |
| *H01Q 1/38* | (2006.01) |
| *H04W 4/80* | (2018.01) |
| *H01Q 1/27* | (2006.01) |

(52) U.S. Cl.
CPC ............ *H04B 1/385* (2013.01); *H01Q 1/273* (2013.01); *H01Q 1/38* (2013.01); *H04B 5/0075* (2013.01); *H04B 5/02* (2013.01); *H04W 4/80* (2018.02); *H04B 2001/3866* (2013.01)

(58) Field of Classification Search
None
See application file for complete search history.

(56) References Cited

U.S. PATENT DOCUMENTS

| | | | |
|---|---|---|---|
| 6,356,238 B1 | 3/2002 | Gainor et al. | |
| 7,002,526 B1 | 2/2006 | Adams et al. | |
| 7,493,047 B2 * | 2/2009 | Shinagawa | H04B 13/005 398/135 |
| 7,813,809 B2 * | 10/2010 | Strother | A61N 1/37247 607/60 |
| 8,073,548 B2 * | 12/2011 | Colvin, Jr. | A61B 5/076 607/60 |
| 8,274,386 B1 | 9/2012 | Dea et al. | |
| 8,325,015 B2 * | 12/2012 | Hall | H01Q 1/2225 340/10.1 |
| 8,606,177 B2 * | 12/2013 | Hwang | H04B 13/005 455/41.1 |
| 8,866,760 B2 * | 10/2014 | Corroy | H04B 13/005 345/173 |
| 8,939,928 B2 * | 1/2015 | Savoie | A61M 5/14248 604/65 |
| 9,244,292 B2 * | 1/2016 | Swab | H04W 52/248 |

(Continued)

*Primary Examiner* — Tuan A Tran

(74) *Attorney, Agent, or Firm* — Culhane Meadows PLLC; Stephen J. Weed

(57) ABSTRACT

A wearable device includes a frame and a magnetic coupler opening formed in the frame. Wearable device further includes a processor, a memory accessible to the processor, and a very high frequency (VHF) radio transceiver for data transmission and reception and connected to the processor. Wearable device further includes a magnetic coupler connected to the VHF radio transceiver. Magnetic coupler includes a diamagnetic material shaped to form a VHF transmission or reception terminal that partially or fully aligns with the magnetic coupler opening. During transmission, magnetic coupler is configured to radiate transmitted VHF band radio modulated signals into tissue of the user. During reception, magnetic coupler is configured to absorb received VHF band radio modulated signals from the tissue of the user.

20 Claims, 12 Drawing Sheets

(56) References Cited

U.S. PATENT DOCUMENTS

| | | | | |
|---|---|---|---|---|
| 9,425,905 B2* | 8/2016 | Lee | ............... | H04B 13/005 |
| 9,641,261 B2* | 5/2017 | Ying | ............... | G06F 1/163 |
| 9,667,353 B2* | 5/2017 | .ANG. strand | ....... | H04W 12/06 |
| 9,722,303 B2* | 8/2017 | Hsieh | ............... | H01Q 5/364 |
| 9,775,520 B2* | 10/2017 | Tran | ............... | G16H 80/00 |
| 9,814,425 B2* | 11/2017 | Tran | ............... | A61B 5/7225 |
| 9,904,321 B2* | 2/2018 | Meyer | ............... | B29C 65/4825 |
| 10,073,953 B2* | 9/2018 | Xing | ............... | H04M 1/72527 |
| 10,345,625 B2* | 7/2019 | Howell | ............... | G02C 5/001 |
| 10,394,280 B2* | 8/2019 | Meyer | ............... | G02C 11/10 |
| 10,404,942 B2* | 9/2019 | Mazzarella | ............ | H04N 7/188 |
| 10,478,127 B2* | 11/2019 | Sampson | ............ | A61B 5/0261 |
| 2006/0252371 A1* | 11/2006 | Yanagida | ............ | H04B 13/005 |
| | | | | 455/41.1 |
| 2008/0294058 A1* | 11/2008 | Shklarski | ............... | G06F 19/00 |
| | | | | 600/502 |
| 2009/0149212 A1* | 6/2009 | Kano | ............... | H04B 13/005 |
| | | | | 455/550.1 |
| 2014/0194702 A1* | 7/2014 | Tran | ............... | A61B 8/06 |
| | | | | 600/301 |
| 2015/0099941 A1* | 4/2015 | Tran | ............... | A61B 5/7214 |
| | | | | 600/300 |
| 2016/0379407 A1* | 12/2016 | Foster | ............... | H04N 13/344 |
| | | | | 13/344 |
| 2017/0075414 A1* | 3/2017 | Grant | ............... | G06F 3/011 |
| 2018/0317770 A1* | 11/2018 | Ortega | ............... | A61B 5/02416 |
| 2018/0345016 A1* | 12/2018 | Agada | ............... | A61N 1/36036 |
| 2019/0125259 A1* | 5/2019 | Huang | ............... | A61B 5/0205 |
| 2019/0183388 A1* | 6/2019 | Cohen | ............... | H04W 4/80 |
| 2019/0229395 A1* | 7/2019 | Hintermann | ............ | G02C 11/10 |
| 2019/0269893 A1* | 9/2019 | Abreu | ............... | A61M 35/00 |
| 2020/0218094 A1* | 7/2020 | Howell | ............... | G02C 11/06 |

* cited by examiner

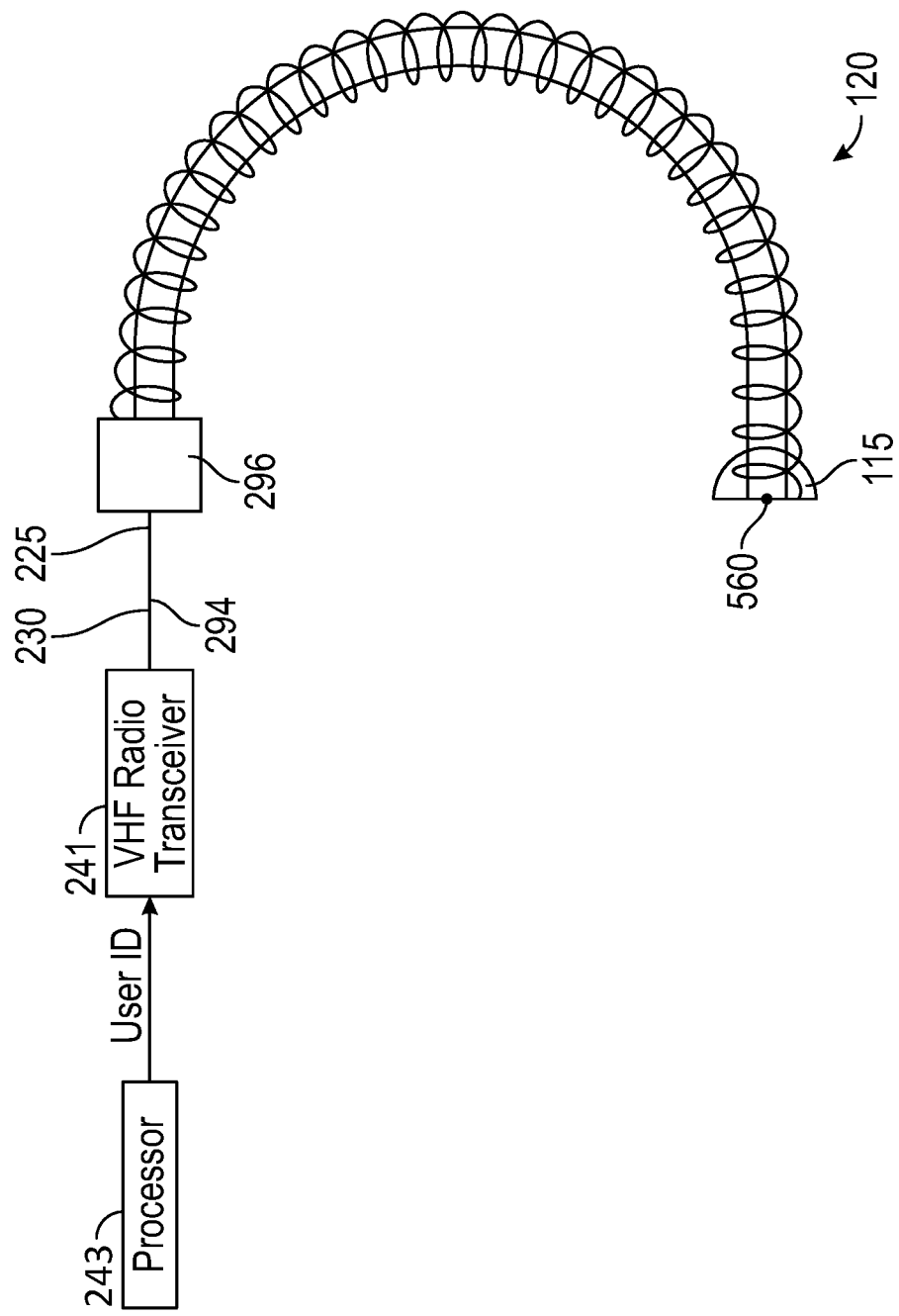

WEARABLE DEVICE ANTENNA

CROSS-REFERENCE TO RELATED APPLICATIONS

This application claims priority to U.S. Provisional application Ser. No. 62/694,102 entitled Wearable Device with Magnetic Coupler for Utilizing Human Body as a Very High Frequency Conduit or Antenna, filed on Jul. 5, 2018, the contents of which are incorporated fully herein by reference.

TECHNICAL FIELD

The present subject matter relates to wearable devices, e.g., eyewear devices, and mobile devices, with magnetic couplers to utilize the human body as a very high frequency (VHF) conduit or antenna.

BACKGROUND

Wearable devices, including portable eyewear devices, such as smartglasses, headwear, and headgear, as well as mobile devices available today integrate radio frequency (RF) transceivers that operate around 2.4 GHz, which is in the ultra-high frequency (UHF) range. WiFi and Bluetooth® are examples of networking protocols that operate around 2.4 GHz in the UHF band. At the 2.4 GHz band, radio waves propagate mainly by line of sight, but are blocked by hills and large buildings; however, the transmission through building walls is strong enough for indoor reception.

Very high frequency (VHF) band is a designation used for the range of radio frequency (RF) electromagnetic waves from 30 to 300 megahertz (MHz). Many well-known, popular wireless technologies occupy this part of the radio spectrum, including frequency modulation (FM) radio, digital television (DTV), and car remotes. Older FM radio technologies have found their way into some modern mobile consumer electronics and are very popular in some parts of the world. Propagation of VHF waves through the air is very good, as is the ability of VHF waves to pass through many non-metallic substances.

Unfortunately, antenna design for the VHF radios inside modern smart mobile devices and wearable devices have been a challenge since the wavelengths are so large, ranging from 10 meters to a meter. The ideal half wavelength dipole antenna cannot possibly fit inside a mobile device anyone wants to carry with them daily or a wearable device. Antenna engineers in the mobile device space have attempted to address this problem by using earphone cables as an antenna because earphone cables can provide a long electrical length needed to operate in the VHF band. However, VHF antenna headphones are not a solution for wearable devices or even for mobile devices in situations where the user does not listen to audio and desires to exchange general data (non-audio data).

Accordingly, size limitations and the small form factor of wearable devices can make VHF antennas difficult to incorporate into the devices. The space for placement of the VHF antenna on the wearable device is limited. A need exists to integrate VHF antenna capabilities with wearable devices, including eyewear devices, and mobile devices for general data exchange, such as non-audio purposes.

BRIEF DESCRIPTION OF THE DRAWINGS

The drawing figures depict one or more implementations, by way of example only, not by way of limitations. In the figures, like reference numerals refer to the same or similar elements.

FIG. 5C shows operation and a circuit diagram of the magnetic coupler of FIGS. 1A-C and 2A-B, the VHF radio transceiver, the envelope detector, and the processor during transmission of RF signals.

DETAILED DESCRIPTION

Figure 1A:
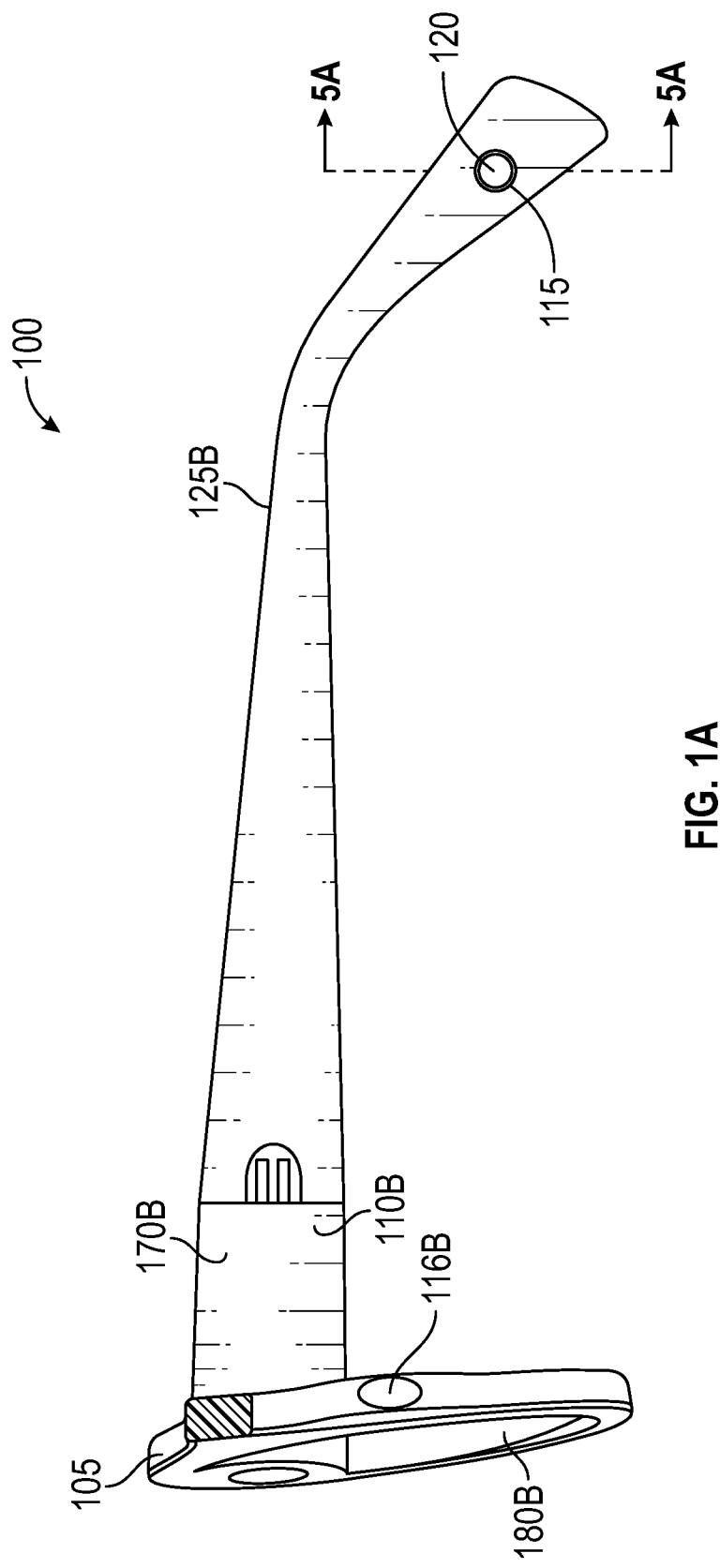
FIG. 1A is a side view of an example hardware configuration of an eyewear device, which includes a magnetic coupler on a temple to utilize a human body as a conduit or antenna for radio frequency (RF) signals for data transmission and reception.

In the following detailed description, numerous specific details are set forth by way of examples in order to provide a thorough understanding of the relevant teachings. However, it should be apparent to those skilled in the art that the present teachings may be practiced without such details. In other instances, description of well-known methods, procedures, components, and circuitry are set forth at a relatively high-level, without detail, in order to avoid unnecessarily obscuring aspects of the present teachings.

The term "coupled" or "connected" as used herein refers to any logical, optical, physical or electrical connection, link or the like by which electrical or magnetic signals produced or supplied by one system element are imparted to another coupled or connected element. Unless described otherwise, coupled or connected elements or devices are not necessarily directly connected to one another and may be separated by intermediate components, elements or communication media that may modify, manipulate or carry the electrical signals. The term "on" means directly supported by an element or indirectly supported by the element through another element integrated into or supported by the element.

The orientations of the eyewear device, associated components and any complete devices incorporating a magnetic coupler such as shown in any of the drawings, are given by way of example only, for illustration and discussion purposes. In operation for exchanging data via the magnetic coupler, the eyewear device may be oriented in any other direction suitable to the particular application of the eyewear device, for example up, down, sideways, or any other orientation. Also, to the extent used herein, any directional term, such as front, rear, inwards, outwards, towards, left, right, lateral, longitudinal, up, down, upper, lower, top, bottom and side, are used by way of example only, and are not limiting as to direction or orientation of any magnetic coupler or component of a magnetic coupler constructed as otherwise described herein.

In a first example, an eyewear device includes a frame that has a bridge and a temple connected to a lateral side of the frame. Eyewear device further includes a magnetic coupler opening formed in the temple or the bridge. Eyewear device further includes a processor, a memory accessible to the processor, and a very high frequency (VHF) radio transceiver for data transmission and reception and connected to the processor. VHF radio transceiver includes a transmitter to modulate a VHF band radio carrier signal with data to generate transmitted VHF band radio modulated signals during transmission. VHF radio transceiver further includes a receiver to demodulate received VHF band radio modulated signals into data during reception. Eyewear device further includes a magnetic coupler connected to the VHF radio transceiver. Magnetic coupler includes a diamagnetic material shaped to form a VHF transmission or reception terminal that partially or fully aligns with the magnetic coupler opening. During transmission, magnetic coupler is configured to radiate the transmitted VHF band radio modulated signals into tissue of the user. During reception, magnetic coupler is configured to absorb the received VHF band radio modulated signals from the tissue of the user. Eyewear device further includes a memory accessible to the processor and programming in the memory.

Execution of the programming by the processor configures the eyewear device to perform functions, including functions to modulate, via the VHF radio transceiver, the VHF band radio carrier signal with data to generate the transmitted VHF band radio modulated signals during transmission. The execution of the programming by the processor further configures the eyewear device to, during transmission, radiate, via the magnetic coupler, the transmitted VHF band radio modulated signals into the tissue of the user. The execution of the programming by the processor further configures the eyewear device to, during reception, absorb, via the magnetic coupler, the received VHF band radio modulated signals from the tissue of the user. The execution of the programming by the processor further configures the eyewear device to demodulate, via the VHF radio transceiver, the received VHF band radio modulated signals into data during reception.

In a second example, a wearable device includes a frame and a magnetic coupler opening formed in the frame. Wearable device further includes a processor, a memory accessible to the processor, and a very high frequency (VHF) radio transceiver for data transmission and reception and connected to the processor. VHF radio transceiver includes a transmitter to modulate a VHF band radio carrier signal with data to generate transmitted VHF band radio modulated signals during transmission. VHF radio transceiver further includes a receiver to demodulate received VHF band radio modulated signals into data during reception. Wearable device further includes a magnetic coupler connected to the VHF radio transceiver. Magnetic coupler includes a diamagnetic material shaped to form a VHF transmission or reception terminal that partially or fully aligns with the magnetic coupler opening. During transmission, magnetic coupler is configured to radiate the transmitted VHF band radio modulated signals into tissue of the user. During reception, magnetic coupler is configured to absorb the received VHF band radio modulated signals from the tissue of the user. Wearable device further includes a memory accessible to the processor and programming in the memory.

Execution of the programming by the processor configures the wearable device to perform functions, including functions to modulate, via the VHF radio transceiver, the VHF band radio carrier signal with data to generate the transmitted VHF band radio modulated signals during transmission. The execution of the programming by the processor further configures the wearable device to, during transmission, radiate, via the magnetic coupler, the transmitted VHF band radio modulated signals into the tissue of the user. The execution of the programming by the processor further configures the wearable device to, during reception, absorb, via the magnetic coupler, the received VHF band radio modulated signals from the tissue of the user. The execution of the programming by the processor further configures the wearable device to demodulate, via the VHF radio transceiver, the received VHF band radio modulated signals into data during reception Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below.

FIG. 1A is a side view of an example hardware configuration of an eyewear device 100, which includes at least one magnetic coupler 120 on a right temple 125B to utilize a human body as a conduit or antenna for radio frequency (RF) signals for data transmission and reception. While described in terms of an eyewear device 100 in the example, it should be understood that the magnetic coupler 120 and other components described herein can be incorporated into other wearable devices or a mobile device, as described in further detail below. The wearable device can be a bracelet, watch, wristband, or other portable device designed to be worn by a user to communicate via one or more wireless networks or wireless links with other wearable devices, mobile device (element 690 of FIG. 6), or server system (element 698 of FIG. 6).

When the magnetic coupler 120 described herein is utilized, efficient coupling with the human body can be obtained which allows the human body act as a conduit or antenna for transmission and reception of the VHF band radio signals. As used herein, the human body is the entire structure of a human being and includes different types of cells that together create tissues and organ systems. The human body includes a head, neck, trunk (e.g. thorax and abdomen), arms, hands, legs, and feet.

Given the height of an average human and the electrical properties of the body, incident VHF band radio signals on human tissue can generate somewhat meaningful signals when a human touches the RF front end of a VHF radio. For example, when two humans make skin-to-skin contact (e.g., handshake or fist bump) VHF radio waves can be transmitted between the two human bodies. While the human body is not a good conductor compared to a half wavelength dipole antenna, meaning the efficiency in received VHF signals are relatively low, human tissue does not actually need to be very highly efficient to work in the VHF band compared to the UHF band. The key, then, to use the human body as a conduit or antenna in the VHF band is to be able to extract RF energy as efficiently as possible via the magnetic coupler 120 and feed that signal to the RF front end for optimum radio performance, which the magnetic coupler 120 described herein enables.

In the example of FIG. 1A, the magnetic coupler 120 is sensitive to the VHF band, which can be low power transmission (e.g., less than 1 milliwatt) of RF signals in the FM band, which range from approximately 87.5 MHz to 108.0 MHz, in 200 kHz steps. As shown in the example, the magnetic coupler 120 is inwards facing from the perspective of a wearer of the eyewear device 100. Generally, received VHF radio signals are captured by the magnetic coupler 120, fed to a VHF radio transceiver (element 241 of FIG. 2B). If an envelope detector (element 242 of FIG. 2B) determines the received VHF radio signals exceed a threshold, those radio signals are digitized by a processor (element 243 of FIG. 2B), and stored in a memory (element 634 of FIG. 6). As will be described in further detail below, envelope detector (element 242 of FIG. 2B), detects an amplitude of VHF waves to determine whether two users are intending to send VHF waves to each other or if the VH waves are just background noise. For example, if the amplitude or VHF radio signal strength is high, envelope detector (element 242 of FIG. 2B) determines the two users are first bumping and thus intending to exchange user identifiers with each other. If the amplitude or VHF radio signal strength is low, envelope detector (element 242 of FIG. 2B) discards the VHF radio signals as background noise, as is the case when the two users are sitting next to each other on a bus, but not making skin-to-skin contact. Envelope detector (element 242 of FIG. 2A) seeks to detect only those VHF radio signals intended for the user by using comparison radio signal strength indicator thresholds.

Transmission of VHF radio signals work similar to reception mode, but in reverse. For example, the electromagnetic fields pass through the magnetic coupler 120 in reverse, which creates a current in a driven element (see 310 of FIG. 3) and that current goes to the VHF radio transceiver (element 241 of FIG. 2B) where the current is demodulated. VHF radio transceiver (element 241 of FIG. 2B) includes a radio mounted on a flexible PCB (element 240 of FIG. 2B). An RF signal (element 230 of FIG. 2B), which can be an RF input/output stream, is supplied or received to/from a driven element (element 310 of FIG. 3) by the VHF radio transceiver (element 241 of FIG. 2B). For example, an RF output (element 225 of FIG. 2B) includes two wires connected from VHF radio transceiver (element 241 of FIG. 2B) to the driven element (element 310 of FIG. 3). Driven element (element 310 of FIG. 3) wraps around diamagnetic material (element 305 of FIG. 3), e.g., with low loss and high magnetic permeability), which couples to the tissue of the user (element 360 of FIG. 3). In one example of reception mode, there is broadcasting of a user identifier modulated in electromagnetic fields, which are transferred through a sender human body. When the electromagnetic fields are coupled to a receiver human body, the electromagnetic fields go through the magnetic coupler 120 in reverse. This creates current on the driven element (element 310 of FIG. 3) and the current goes to a receiver circuit of the VHF radio transceiver (element 241 of FIG. 2A). The receiver circuit demodulates information corresponding to the user identifier.

In both reception and transmission modes, the structure and orientation of the magnetic coupler 120 maximizes efficiency. VHF radio transceiver (element 241 of FIG. 2B) transmits or receives small packets of information, such as user identifiers, at low power levels and in short periods. In some of the examples herein, the magnetic coupler 120 is coupled to human skin and includes a U-shaped or half toroid piece of ferrite with an electrically conductive coil wrapped around. As explained in further detail below, ferrite is a type of magnetic permeable material, which is nonconductive. Generally, the magnetic coupler 120 is formed of a diamagnetic material (element 305 of FIG. 3), which typically have a relative magnetic permeability higher than one ($\mu \approx 12.57 \times 10^{-7}$ H/m). A magnetic coupler 120 formed of a low relative permeability material may be insufficient to provide highly efficient magnetic coupling. Hence, in some examples, the magnetic permeability of the diamagnetic material (element 305 of FIG. 3) is highly permeable, meaning materials with a permeability of approximately 10 to or greater; thus, the VHF magnetic energy is increased by ten-fold for the same amount of current inside the diamagnetic material 305.

Figure 2A:
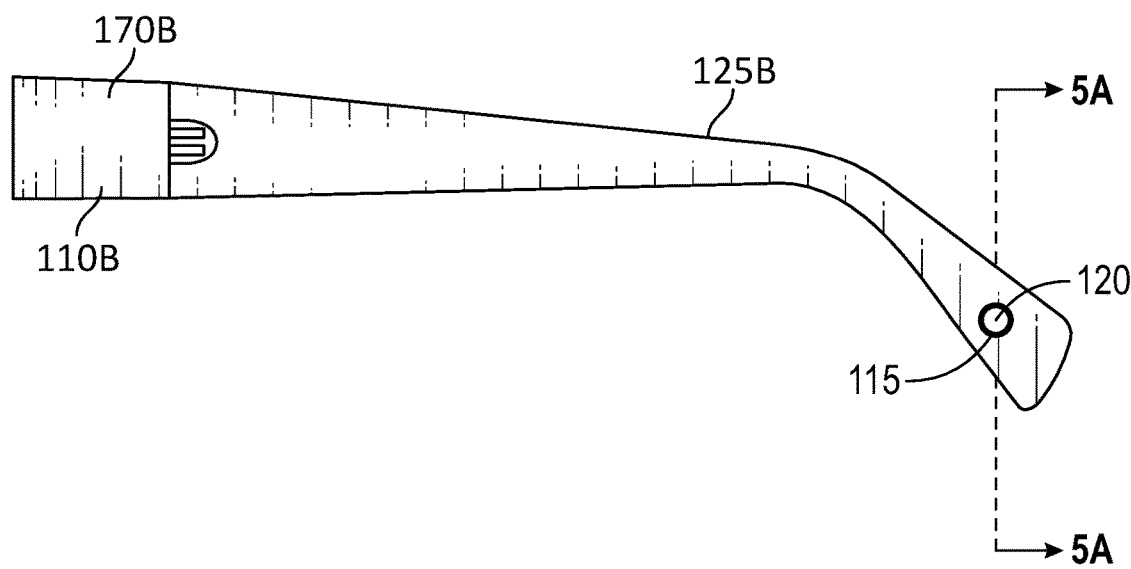
FIG. 2A shows an external side view of a temple of the eyewear device of FIG. 1A depicting the magnetic coupler.
Figure 2B:
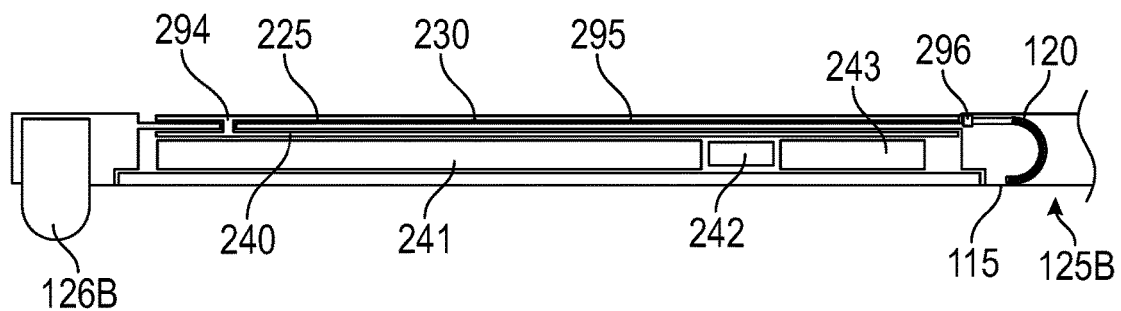
FIG. 2B illustrates an internal side view of the components of the portion of temple of the eyewear device of FIGS. 1A and 2A with a cross-sectional view of a circuit board with a VHF radio transceiver, an envelope detector, and a processor.

VHF band radio signals from a VHF radio transceiver (element 241 of FIG. 2B) are efficiently coupled to the human body in order to reduce the operating power needs of the VHF radio transceiver (element 241 of FIG. 2B). In an example, when two users, each of which is wearing a respective eyewear device 100 engage in skin-to-skin contact gestures (e.g., a fist bump or handshake), the RF energy is transferred between from one human body to the other human body with very low power (e.g., less than Bluetooth® protocol)

In an example, a system includes the eyewear device 100. The eyewear device 100 includes a frame 105, a right temple 125B extending from a right lateral side 170B of the frame 105. For example, the right temple 125B is connected to the right lateral side 170B of frame 105 via right chunk 110B. Eyewear device 100 may further include an image display (e.g., optical assembly 180A-B shown in FIGS. 1B-C) to present a graphical user interface to a user. The eyewear device 100 can further include a camera (e.g., visible light camera 314 of FIG. 3) connected to the frame 105 or the right temple 125B to capture an image of a scene. Although not shown in FIGS. 1A-C, the eyewear device 100 further includes a processor (element 243 of FIG. 2B) coupled to the eyewear device 100 and connected to the camera (element 314 of FIG. 3). Eyewear device 100 further includes a memory (element 634 of FIG. 6) accessible to the processor (element 243 of FIG. 2B) and programming in the memory (element 634 of FIG. 6), for example in the eyewear device 100 itself or another part of the system.

Figure 1B:
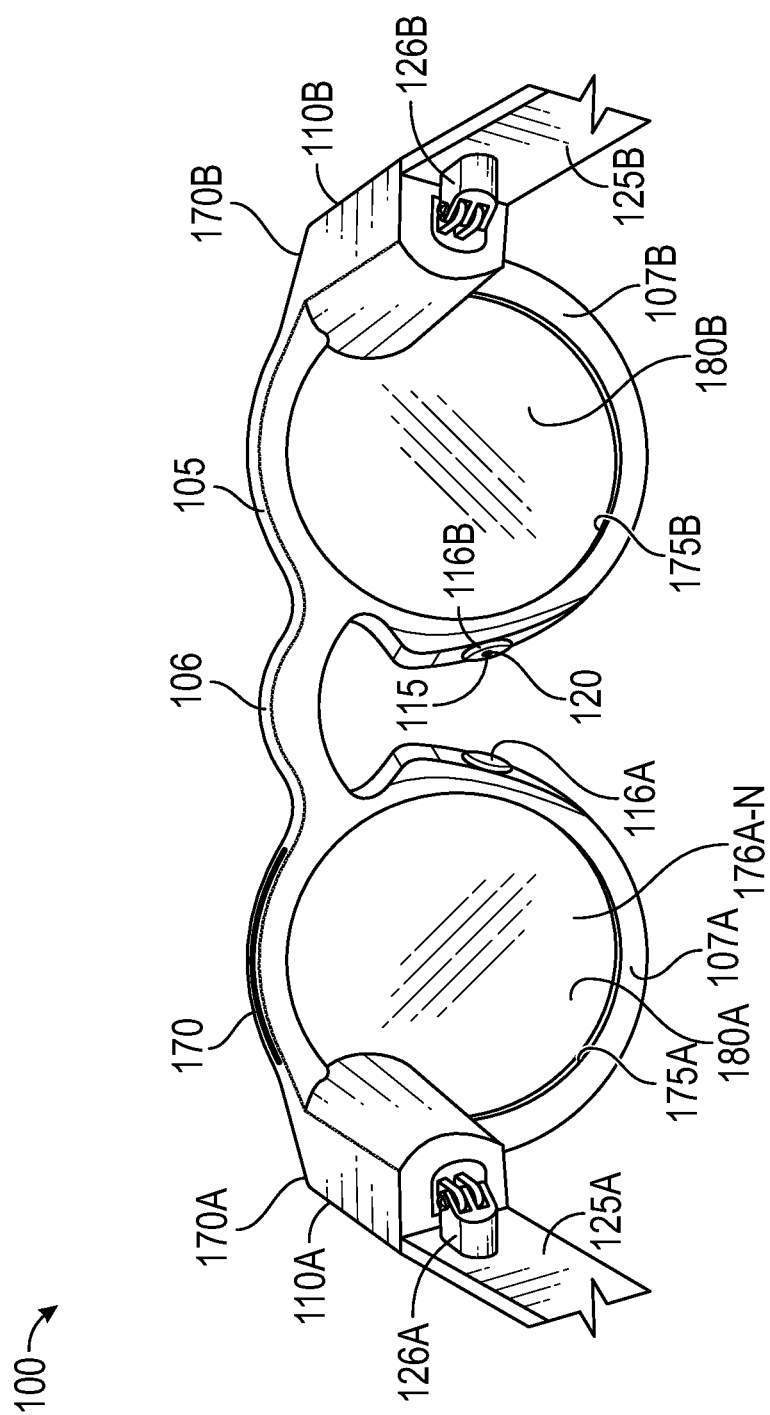
FIGS. 1B and 1C are rear views of example hardware configurations of the eyewear device of FIG. 1A, including two different placements of the magnetic coupler.

Eyewear device 100 includes a magnetic coupler opening 115 formed in the right temple 125B or the bridge (element 106 of FIG. 1B). The right temple 125B is adapted to extend over an ear of a user. Although not shown in FIG. 1A, eyewear device 100 further includes a very high frequency (VHF) radio transceiver (element 241 of FIG. 2B) for data transmission and reception and connected to the processor (element 243 of FIG. 2B). VHF radio transceiver (element 241 of FIG. 2B) includes a transmitter to modulate a VHF band radio carrier signal with data to generate transmitted VHF band radio modulated signals during transmission. VHF radio transceiver (element 241 of FIG. 2B) further includes a receiver to demodulate received VHF band radio modulated signals into data during reception.

Magnetic coupler 120 is connected to the VHF radio transceiver (element 241 of FIG. 2B) and includes a diamagnetic material (element 305 of FIG. 3) shaped to form a RF transmission or reception terminal (element 560 of FIGS. 5A-C) that partially or fully aligns with the magnetic coupler opening 115. During transmission, magnetic coupler 120 is configured to radiate the transmitted VHF band radio modulated signals into tissue of the user (element 360 of FIG. 3). During reception, magnetic coupler 120 is configured to absorb the received VHF band radio modulated signals from the tissue of the user (element 360 of FIG. 3).

Electronics for the VHF radio transceiver (element 241 of FIG. 2B) can be on a long flexible PCB 240 in the right temple 125B as shown in FIG. 2B. Right chunk 110B can also include other network transceivers, such as WiFi and Bluetooth®, as well as a visible light camera (element 314 of FIG. 3) on another flexible PCB. In another example, RF output (element 225 of FIG. 2B) can include two twisting wires from the flexible PCB in the right chunk 110B that enter and run through the temple 125B which then connect to the driven element (element 310 of FIG. 3). Driven element (element 310 of FIG. 3) can integrate the two wires of RF output (element 225 of FIG. 2B), such that the VHF radio transceiver (element 241 of FIG. 2B) is integrated with the driven element (element 310 of FIG. 3). Alternatively, driven element (element 310 of FIG. 3) can be a separate conductive medium that is integrated with the diamagnetic material (element 305 of FIG. 3) of magnetic coupler 120.

Execution of the programming by the processor (element 243 of FIG. 2B) configures the eyewear device 100 to perform functions, including functions to modulate, via the VHF radio transceiver (element 241 of FIG. 2B), the VHF band radio carrier signal with data to generate the transmitted VHF band radio modulated signals during transmission. The data (e.g., information signal) used to modulate the carrier VHF band carrier signal, alters some aspect and thus piggybacks on the VHF band carrier signal. The modulated VHF band carrier signal is amplified and applied to the transmitting magnetic coupler 120. The oscillating current pushes the electrons in the transmitting magnetic coupler 120 back and forth, creating oscillating electric and magnetic fields, which radiate the energy away from the magnetic coupler 120 at the RF transmission or reception terminal (element 560 of FIGS. 5A-C) creating VHF radio waves. The VHF radio waves carry the data (e.g., user identifier) from a wearer of the eyewear device 100 (transmitting human body) to a receiving human body that wears a receiving eyewear device with a receiving magnetic coupler.

Figure 3:
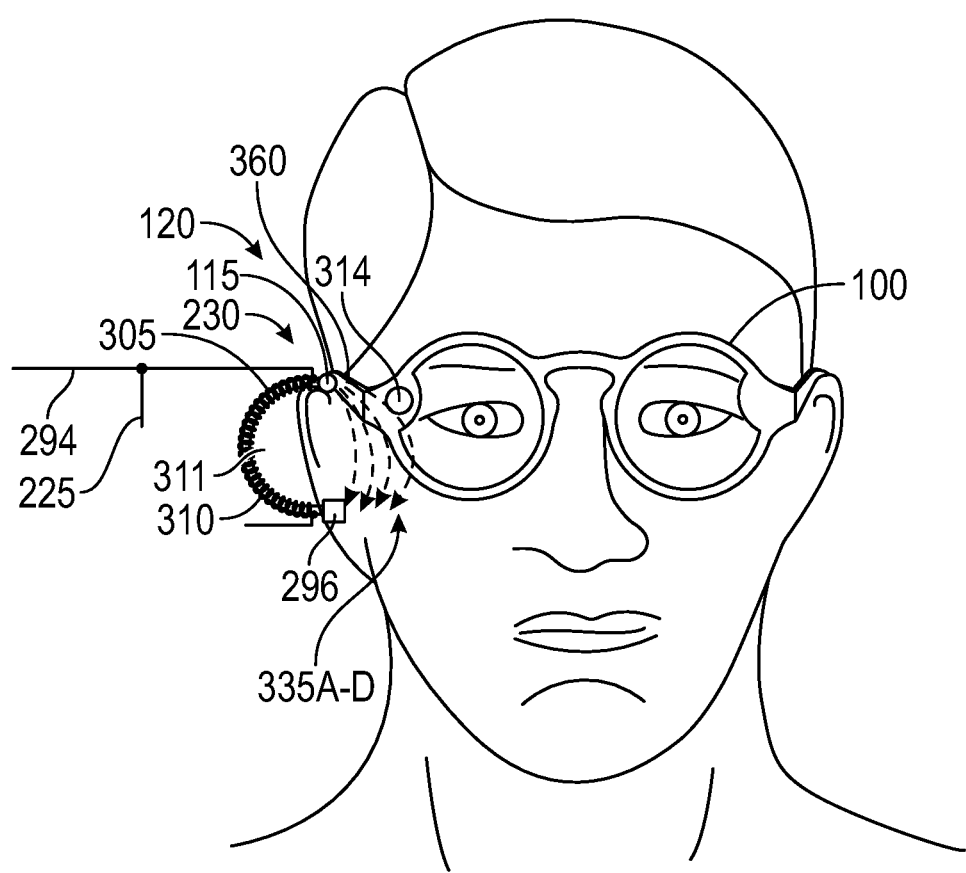
FIG. 3 depicts a schematic view of operation of the magnetic coupler placed on an inner side of the temple of the eyewear device utilizing the human body as a conduit or antenna for RF signals.

The execution of the programming by the processor (element 243 of FIG. 2B) further configures the eyewear device 100 to, during transmission, radiate, via the magnetic coupler 120, the transmitted VHF band radio modulated signals into the tissue of the user (element 360 of FIG. 3). The execution of the programming by the processor (element 243 of FIG. 2B) further configures the eyewear device 100 to, during reception, absorb, via the magnetic coupler 120, the received VHF band radio modulated signals from the tissue of the user (element 360 of FIG. 3). At the receiving human body, the oscillating electric and magnetic fields of the incoming VHF radio wave push electrons back and forth to create a tiny oscillating voltage in the receiving magnetic coupler 120, which is a weaker replica of the current from the transmitting magnetic coupler 120. This voltage is applied to the VHF radio transceiver (element 241 of FIG. 2B), which extracts the data (e.g., user identifier). Hence, the execution of the programming by the processor (element 243 of FIG. 2B) further configures the eyewear device 100 to demodulate, via the VHF radio transceiver (element 241 of FIG. 2B), the received VHF band radio modulated signals into data during reception.

Figure 1C:
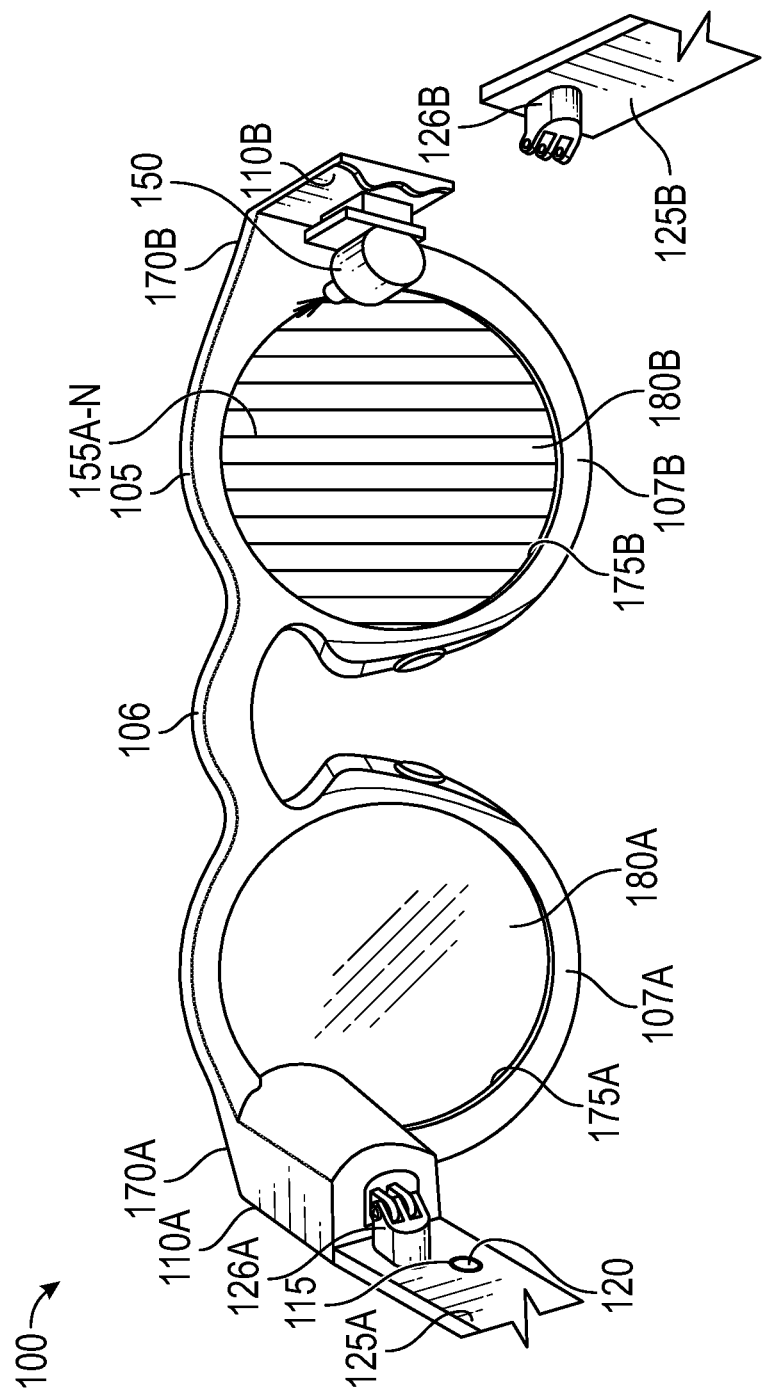

As shown in FIGS. 1A-C, the eyewear device 100 is in a form for wearing by a user, which are eyeglasses in the example of FIGS. 1A-C. The eyewear device 100 can take other forms and may incorporate other types of frameworks, for example, a headgear, a headset, or a helmet. In the eyeglasses example, eyewear device 100 includes a frame 105 including a left rim 107A connected to a right rim 107B via a bridge 106 adapted for a nose of the user (e.g., to contact the nose). The left and right rims 107A-B include respective apertures 175A-B, which hold a respective optical assembly 180A-B. Optical assembly 180A-B can include various optical layers 176A-N and an image display device. The left and right temples 125A-B extend from respective lateral sides of the frame 105, for example, via respective left and right chunks 110A-B. A substrate or materials forming the temple 125A-B can include plastic, acetate, metal, or a combination thereof. The chunks 110A-B can be integrated into or connected to the frame 105 on the lateral side FIGS. 1B-C are rear views of example hardware configurations of the eyewear device 100 of FIG. 1A, including two different placements of the magnetic coupler 120. As shown in FIG. 1B, magnetic coupler 120 and magnetic coupler opening 115 are located on a right nose pad 116B of bridge 106 and the magnetic coupler opening 115 is formed in the right nose pad 116B. Nose pads 116A-B are adapted to contact the nose of the user. As shown in FIG. 1C, the magnetic coupler 120 and magnetic coupler opening 115 are located on a portion of the left temple 125A, which is in closer proximity to the left chunk 110A. Typically, the VHF radio transceiver (element 241 of FIG. 2B), envelope detector (element 242 of FIG. 2B), processor (element 243 of FIG. 2B), and other circuitry are located on at least one flexible printed circuit (PCBs) located in a chunk 110A-B and temples 125A-B. In one example, the VHF radio transceiver (element 241 of FIG. 2B) is located in the left chunk 110A and RF output (element 225 of FIG. 2B) electrically connects the magnetic coupler 120 in the left temple 125A to the VHF radio transceiver (element 241 of FIG. 2B) in the left chunk 110A. Having the magnetic coupler 120 located on a portion of the left temple 125A, which is closer to the left chunk 110A reduces the run of conductive trace(s), electrical interconnect(s) 294, etc. forming the RF output (element 225 of FIG. 2B).

Alternate placement locations for the magnetic coupler 120 on the eyewear device can be used individually or in combination. For example, multiple magnetic couplers 120 can be included in the eyewear device 100 to enhance VHF radio signal strength and reduce errors in the exchange of data (e.g., user identifiers). Additionally, the magnetic coupler 120 and magnetic coupler opening 115 can be located on other portions of the eyewear device 100, including the right chunk 110B; upper, middle, and lower portions of the rims 107A-B; the various parts of the bridge 106, including the left nose pad 116A, or any other location on the temples 125A-B. However, typically placement on the nose pads 116A-B or portions of the temples 125A-B that wrap around the ears of the users is ideal (e.g., just behind the ear). Touching of the skin by the magnetic coupler 120 exiting through the magnetic coupler opening 115 is preferred to an air gap, which reduces coupling efficiency. Coupling efficiency drops by $R^4$ depending on the size of the air gap. Whether an air gap exists or not, a cutout forms the magnetic coupler opening 115 in the eyewear device 100 allow the VHF radio waves to couple between the magnetic coupler 120 and human tissue of the user (element 360 of FIG. 3), e.g., side of the human head.

As shown in FIGS. 1B-C, the eyewear device 100 can include two different types of image displays. In one example, the image display of optical assembly 180A-B includes an integrated image display. An example of such an integrated image display is disclosed in FIG. 5 of U.S. Pat. No. 9,678,338, filed Jun. 19, 2015, titled "Systems and Methods for Reducing Boot Time and Power Consumption in Wearable Display Systems," which is incorporated by reference herein. As shown in FIG. 1B, the optical assembly 180A-B includes a suitable display matrix 170 of any suitable type, such as a liquid crystal display (LCD), an organic light-emitting diode (OLED) display, or any other such display. The optical assembly 180A-B also includes an optical layer or layers 176, which can include lenses, optical coatings, prisms, mirrors, waveguides, optical strips, and other optical components in any combination. The optical layers 176A-N can include a prism having a suitable size and configuration and including a first surface for receiving light from display matrix and a second surface for emitting light to the eye of the user. The prism of the optical layers 176A-N extends over all or at least a portion of the respective apertures 175A-B formed in the left and right rims 107A-B to permit the user to see the second surface of the prism when the eye of the user is viewing through the corresponding left and right rims 107A-B. The first surface of the prism of the optical layers 176A-N faces upwardly from the frame 105 and the display matrix overlies the prism so that photons and light emitted by the display matrix impinge the first surface. The prism is sized and shaped so that the light is refracted within the prism and is directed towards the eye of the user by the second surface of the prism of the optical layers 176A-N. In this regard, the second surface of the prism of the optical layers 176A-N can be convex to direct the light towards the center of the eye. The prism can optionally be sized and shaped to magnify the image projected by the display matrix 170, and the light travels through the prism so that the image viewed from the second surface is larger in one or more dimensions than the image emitted from the display matrix 170.

In another example, the image display device of optical assembly 180A-B includes a projection image display as shown in FIG. 1C. An example of a projection image display is disclosed in FIG. 6 of U.S. Pat. No. 9,678,338, filed Jun. 19, 2015, titled "Systems and Methods for Reducing Boot Time and Power Consumption in Wearable Display Systems," which is incorporated by reference herein. The optical assembly 180A-B includes a laser projector 150, which is a three-color laser projector using a scanning mirror or galvanometer. During operation, an optical source such as a laser projector 150 is disposed in or on one of the temples 125A-B of the eyewear device 100. Optical assembly 180-B includes one or more optical strips 155A-N spaced apart across the width of the lens of the optical assembly 180A-B or across a depth of the lens between the front surface and the rear surface of the lens.

As the photons projected by the laser projector 150 travel across the lens of the optical assembly 180A-B, the photons encounter the optical strips 155A-N. When a particular photon encounters a particular optical strip, the photon is either redirected towards the user's eye, or it passes to the next optical strip. A combination of modulation of laser projector 150, and modulation of optical strips, may control specific photons or beams of light. In an example, a processor controls optical strips 155A-N by initiating mechanical, acoustic, or electromagnetic signals. Although shown as having two optical assemblies 180A-B, the eyewear device 100 can include other arrangements, such as a single or three optical assemblies, or the optical assembly 180A-B may have arranged different arrangement depending on the application or intended user of the eyewear device 100.

As further shown in FIGS. 1B-C, eyewear device 100 includes a left chunk 110A adjacent the left lateral side 170A of the frame 105 and a right chunk 110B adjacent the right lateral side 170B of the frame 105. The chunks 110A-B may be integrated into the frame 105 on the respective lateral sides 170A-B (as illustrated) or implemented as separate components attached to the frame 105 on the respective sides 170A-B. Alternatively, the chunks 110A-B may be integrated into temples 125A-B attached to the frame 105.

FIG. 2A shows an external side view of a temple of the eyewear device 100 of FIG. 1A depicting the magnetic coupler 120. Right temple 125B includes the magnetic coupler 120, which is located inside the magnetic coupler opening 115 and can extend through the magnetic coupler opening 115. For example, the magnetic coupler 120 protrudes through the magnetic coupler opening 115 to project through the magnetic coupler opening 115 and touches behind the ear of the user of the eyewear device 100. Magnetic coupler 120 includes a VHF transmission or reception terminal (element 560 of FIGS. 5A-C) that extends through the magnetic coupler opening 115 to contact the tissue of the user (element 360 of FIG. 3). VHF transmission or reception terminal (element 560 of FIGS. 5A-C) has a contour that does not bite into skin tissue of the user (element 360 of FIG. 3), e.g., the contour is relatively flat. Alternatively or additionally, VHF transmission or reception terminal (element 560 of FIGS. 5A-C) is flexible so to allow deformation when contact is made with the tissue of the user (element 360 of FIG. 3). However, in some examples, the VHF transmission or reception terminal (element 560 of FIGS. 5A-C) may not extend through or only partially extends through the magnetic coupler opening 115 to improve comfort of the user wearing the eyewear device 100. Hence, the VHF transmission or reception terminal (element 560 of FIGS. 5A-C) can be air gapped with the tissue of the user (element 360 of FIG. 3) to enhance comfort if magnetic coupling efficiency is not a top priority.

FIG. 2B illustrates an internal side view of the components of the portion of temple of the eyewear device of FIGS. 1A and 2A with a cross-sectional view of a circuit board 240 with a VHF radio transceiver 241, an envelope detector 242, and a processor 243. Although the circuit board 240 is a flexible printed circuit board (PCB), it should be understood that the circuit board 240 can be rigid in some examples. In some examples, the frame 105 or the chunk 110A-B can include the circuit board 240 that includes the VHF radio transceiver 241, the envelope detector 242, and the processor 243. In one example, VHF radio transceiver 241 and the envelope detector 242 are integrated in a system on chip (SOC), which includes a dedicated microprocessor integrated circuit (IC) along with volatile memory used by the microprocessor to operate. The system on a chip can be customized for converting data into RF signals and vice versa, which are conveyed to and from the magnetic coupler 120, e.g., modulating and demodulating; and threshold comparison processing for the envelope detector 242. In some examples, VHF radio transceiver 241 and envelope detector 242 may not be separate components, for example, functions and circuitry implemented in VHF radio transceiver 241 can be incorporated or integrated into the envelope detector 242 itself.

VHF radio transceiver 241, envelope detector 242, and processor 243 can be soldered on the circuit board 240 and are electrically connected via various electrically conductive traces, such as planar electrodes, and pads, which may be formed of metal or other conductive materials. Blind and through vias can be formed in the flexible PCB 240 and then electrical interconnects 294 can be used to electrically connect the VHF radio transceiver 241, the envelope detector 242, and the processor 243 to the magnetic coupler 120. Machining operations may be used to form non-constant planar conductive traces, for example. In the example where the magnetic coupler 120 is located in the right temple 125B, VHF radio transceiver 241 is connected to the magnetic coupler 120 through an RF output 225 line feed. RF output 225 line feed includes an electrical interconnect 294, which is a conductive medium filling in a via in the flexible PCB 240. Electrical interconnect 294 in turns connects to an electrically conductive trace 295 which, in turn connects to an electrically conductive pad 296 in the example.

In other examples, a chunk (elements 110A-B of FIGS. 1B-C), such as right chunk 110B is integrated into or connected to the frame 105 on the right lateral side 170B and the flexible printed circuit board (PCB) 240 is mounted inside the right chunk 110B. VHF radio transceiver 241 and the processor 243 are disposed on the flexible PCB 240. The driven element (element 310 of FIG. 3) of the magnetic coupler 120 is electrically connected through RF output 225 line feed, which is formed one or more electrical interconnects 294, electrically conductive traces 295, or electrically conductive pads 296 to the VHF radio transceiver 241. An envelope detector 242 is an electronic circuit that takes a VHF radio signal as input and provides a DC output, which is the envelope of the original VHF radio signal. Envelope detector 242 can include a rectifier circuit, which includes basic diode and low pass filter circuit. The capacitor in the rectifier circuit stores up charge on the rising edge and releases it slowly through the resistor when the signal falls. The diode in series rectifies the incoming VHF radio signal, allowing current flow only when the positive input terminal is at a higher potential than the negative input terminal. Either half-wave or full-wave rectification of the VHF radio signal can be utilized to convert the VHF radio input signal into a pulsed DC output signal. Hence, the envelope detector 242 can be used to detect the information stored in the envelope of VHF radio signals.

FIG. 3 depicts a schematic view of operation of the magnetic coupler 120 placed on an inner side of the temple of the eyewear device 100 utilizing the human body as a conduit or antenna for RF signals 330. During transmission, data from the processor (element 243 of FIG. 2B) is conveyed to the VHF radio transceiver (element 241 of FIG. 2B), which is modulated into VHF band radio modulated signals (RF signal 330) that are conveyed from the VHF radio transceiver 241 through the electrical interconnect 294 to the electrical magnetic coupler 120. Magnetic coupler radiates the VHF band radio modulated signals into the tissue of the user 360 wearing the eyewear device 100. During transmission, as shown, the magnetic field 335A is initially circumferential but then becomes a longitudinal magnetic field 335D in the human body after wrapping around the magnetic coupler 120 and exiting VHF transmission or reception terminal (element 560 of FIGS. 5A-C).

During reception, the magnetic coupler 120 absorbs the received VHF band radio modulated signals (RF signal 330) from the tissue of the user 360 and conveys the VHF band radio modulated signals through the electrical interconnect 294 to the VHF radio transceiver (element 241 of FIG. 2B). The tissue of the user 360 is on a head of a human body (element 405B of FIGS. 4A-B). Magnetic fields are induced in the magnetic coupler 120 from longitudinal received electric fields (elements 436A-D of FIGS. 4A-B) in the human body (element 405B of FIGS. 4A-B). Envelope detector (element 242 of FIG. 2B) detects the strength (e.g., amplitude of the signals) received by the VHF radio transceiver (element 241 of FIG. 2B), and if the strength exceeds a threshold, then the processor 243 (element 243 of FIG. 2B), receives demodulated data from the VHF radio transceiver 241. During reception, the magnetic coupler 120 absorbs the received VHF band radio modulated signals 230 as longitudinal electric fields (element 436A-D of FIGS. 4A-B) with magnetic field components at VHF transmission or reception terminal (element 560 of FIGS. 5A-C).

As shown, magnetic coupler 120 is formed of a diamagnetic material 305 with high magnetic permeability. It should be appreciated that the magnetic coupler 120 is not to scale in FIG. 3, but is enlarged in size to depict its various electromechanical structures and electrical operation. Typically, diamagnetic materials have a magnetic permeability of 1 mu or less. In electromagnetism, permeability is the measure of the ability of a material to support the formation of a magnetic field within itself. Hence, permeability is the degree of magnetization that a material obtains in response to an applied magnetic field. Magnetic permeability is typically represented by the (italicized) Greek letter p (mu). In the example, diamagnetic material 305 includes ferrite and has a high magnetic permeability which is 10 mu or greater. Ferrite is a ceramic material made by mixing and firing large proportions iron (III) oxide ($Fe_2O_3$, rust) blended with small proportions of one or more additional metallic elements, such as barium, manganese, nickel, and zinc. Ferrite is both electrically non-conductive, meaning an insulator, and ferrimagnetic, meaning ferrite can easily be magnetized or attracted to a magnet. Ferrites can be divided into several families based on resistance to being demagnetized (magnetic coercivity). The families include hard ferrites that have high coercivity and are difficult to demagnetize, soft ferrites that have low coercivity and easily change their magnetization, and semi-hard ferrites that are in between. Diamagnetic material 305 is shaped to form the magnetic coupler 120 as a fraction or portion of a toroid, polyhedron, ellipsoid, or other quadric surface that is typically solid, but shaped with a hollow interior cavity space 311 to allow wrapping of driven element 310 (e.g., hollow interior cavity space 311 is a donut hole in the half-toroid example). In the example, the ferrite-based diamagnetic material 305 is shaped to form a half toroid. When the diamagnetic material 305 is a ferrite half toroid shape, the outer diameter may be about 4 millimeters (mm) because a six foot tall human provides sufficient length to radiate and absorb VHF radio signals in order to transmit and receive and transmit at that VHF wavelength.

As shown, magnetic coupler 120 includes a driven element 310, which is an electrically conductive material. Driven element 310 connects to the diamagnetic material 305 and includes a conductive coil (e.g., formed of metal), which wraps around the diamagnetic material 305 (e.g., ferrite). Driven element is coupled to the VHF radio transceiver 241, such as through the depicted electrically conductive pad 296.

As shown in FIG. 3, eyewear device 100 includes at least one visible light camera 314 that is sensitive to the visible light range wavelength. Visible light camera 314 has a frontward facing field of view. Examples of such a visible light camera 314 include a high-resolution complementary metal-oxide-semiconductor (CMOS) image sensor and a video graphic array (VGA) camera, such as 640p (e.g., 640×480 pixels for a total of 0.3 megapixels), 720p, or 1080p. Image sensor data from the visible light camera 314 is captured along with geolocation data, digitized by an image processor (element 612 of FIG. 6), stored in a memory (element 634 of FIG. 6), and displayed on the image display device of optical assembly 180A-B of FIGS. 1A-C.

Figure 4A:
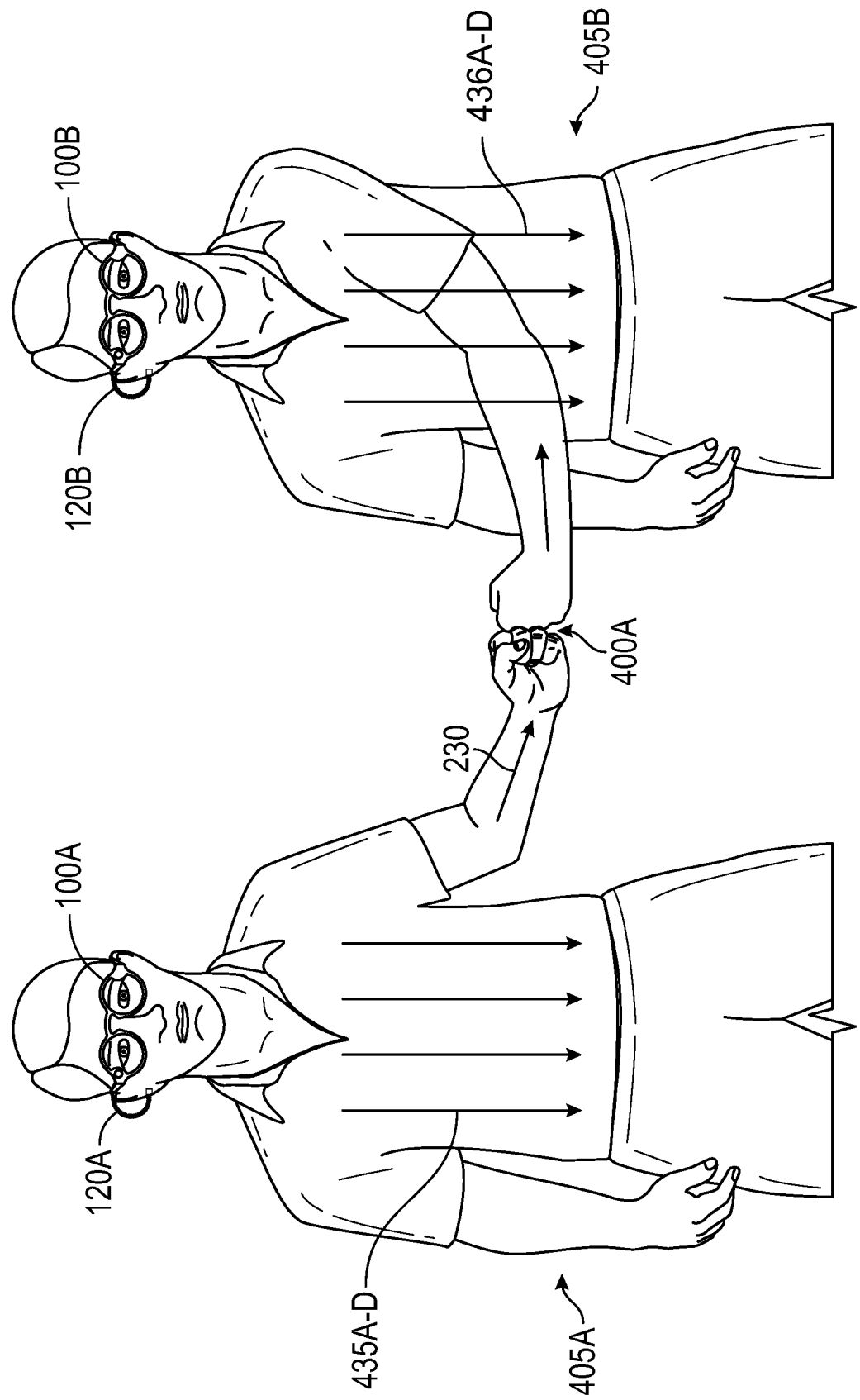
FIG. 4A depicts an example of a pattern of electric fields generated by a transmitting magnetic coupler on a first human body and received by a receiving magnetic coupler on a second human body while fist bumping.
Figure 4B:
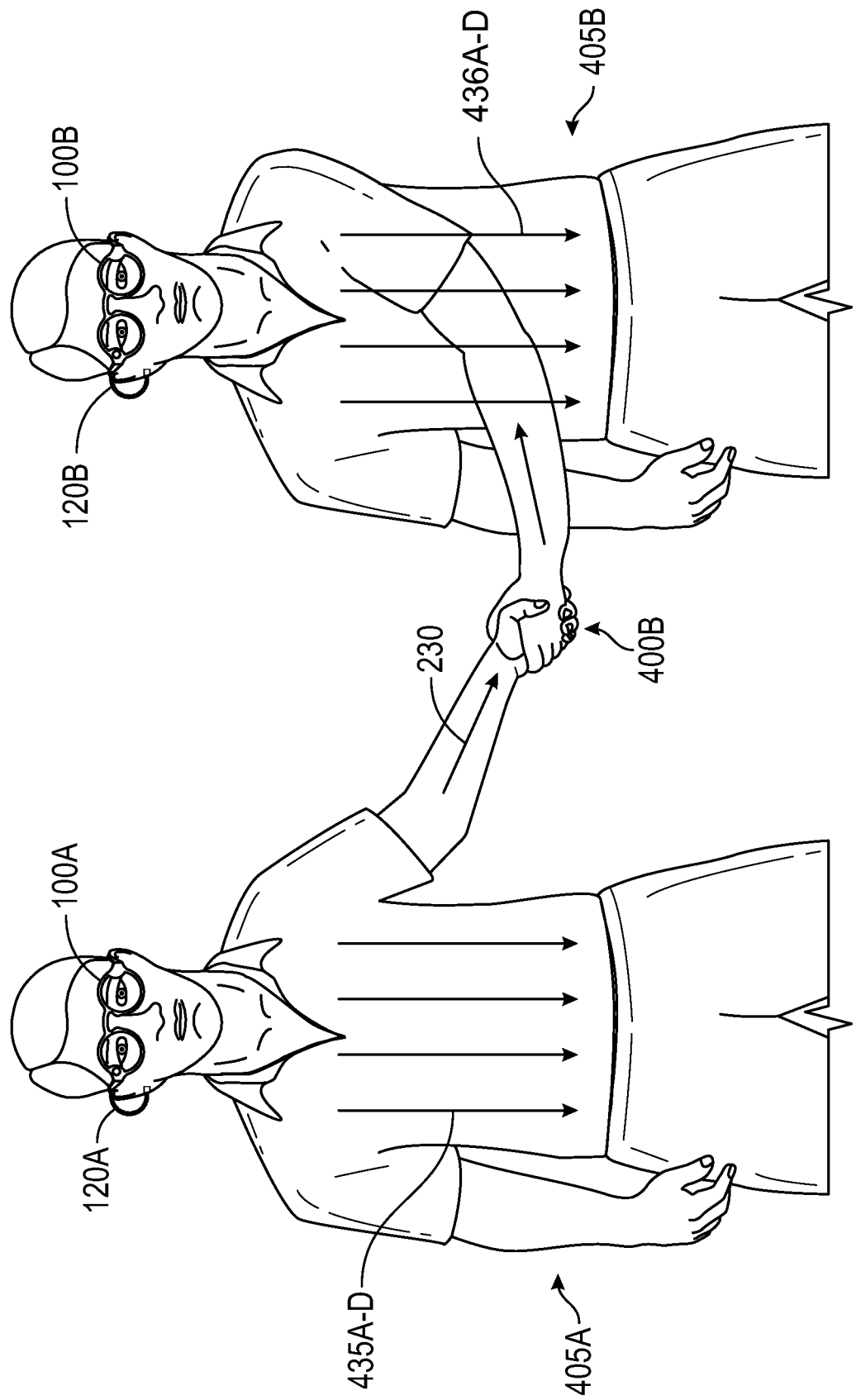
FIG. 4B depicts an example of a pattern of electric fields generated by the transmitting magnetic coupler on a first human body and received by the receiving magnetic coupler on a second human body while handshaking.

FIG. 4A depicts an example of a pattern of transmitted electric fields 435A-D of the RF signal 230 generated by a transmitting magnetic coupler 120A of a first eyewear device 100A worn on a head of a first human body 405A. As shown, the transmitted magnetic fields 435A-D of RF signal 230 are received by a receiving magnetic coupler 120B on a second eyewear device 100B worn on a head of a second human body 405B during a fist bump 400A greeting. FIG. 4B depicts an example of a pattern of electric fields 435A-D of RF signal 230 generated by the transmitting magnetic coupler 120A and received by the receiving magnetic coupler 120B on the second human body 405B. Transmitting magnetic coupler 120A creates circumferential magnetic fields (elements 335A-D of FIG. 3) on the human head that in turn induce longitudinal electric fields (elements 435A-D) on the first human body 435A-D.

As noted, one such application of the eyewear devices 100A-B with the magnetic couplers 120A-B are to have the ability to transmit or even broadcast a user identifier and as the RF signal 230. Thus, RF signal 230 can encodes user identifier (or other data) and the magnetic coupler 120A induces the longitudinal transmitted electric fields 435A-D in the first human body 405B, which are then transferred into the second human body 405B as the longitudinal received electric fields 436A-D. VHF radio transceiver 241 can be tuned and optimized such that a user identifier or other data exchange can occur when the two people, such as the first human body 405A and the second human body 405B, wearing eyewear devices 100A-B do a fist bump 400A or handshake 400B. Essentially, a ritual used when two people are introduced, greet, or interact with each other, can be used to introduce and have their digital personas interact.

In FIGS. 4A-B, when clothes and skin are touching each other, the RF energy flowing through jumps to the other person during the fist bump 400A or handshake 400B. However, if the hands of the human bodies 405A-B are in a closed position, as is the case with a fist bump 400A instead of the handshake 400B, there is a 10 decibel drop in coupling. In both FIGS. 4A-B, the human bodies 405A-B are utilized as transmitting and receiving VHF conduits, but in other examples the human bodies 405A-B can be used as a transmitting and receiving wireless antennas if driven with higher power VHF energy. In the wireless antenna mode, the human bodies 405A-B can be five feet away with no skin-to-skin contact, so higher power VHF energy is emitted by the transmitting magnetic coupler 120A, which means increased power is drained by the VHF radio transceiver 241 from the power source (e.g., battery). Wireless antenna mode for the human bodies 405A-B can be useful in certain environments, e.g., broadcasting user identifiers at a music festival. However, in conduit mode, the human bodies 405A-B engage in direct skin-to-skin contact, so the VHF radio transceiver (element 241 of FIG. 2B) operates on low energy, which conserves battery power in the eyewear device 100 (e.g., far lower than Bluetooth®), which is better suited to business or face-to-face meetings.

In some examples, the frame 105, bridge, 106, rims 107A-B, and temples 125A-B of the eyewear device 100 can be formed of acetate. However, because of the magnetic coupler opening 120, e.g., cutout in the component(s), there is virtually no loss of RF signal 230. VHF transmission or reception terminal (element 560 of FIGS. 5A-C) exiting the magnetic coupler opening 120 in the right temple 125B or nose pad 116B of bridge 106 can be cut to allow the VHF transmission or reception terminal 560 to touch the skin tissue of the user (element 360 of FIG. 3). In some examples, an air gap (e.g., space) may be formed between the VHF transmission or reception terminal (element 560 of FIG. 5) and the skin tissue of the user (element 360 of FIG. 3). However, the magnetic coupling efficiency drops by $R^4$ depending on size of the air gap. Hence, magnetic coupling occurs but not as efficiently, meaning the VHF radio transceiver (element 241 of FIG. 2B) may need more power.

Electromagnetic waves are circumferential as they wrap around the driven element 310 of magnetic coupler 120 and are then transformed into longitudinal electromagnetic fields 335A-D when exiting driven element 310 into the tissue of the user 360. Conventional VHF is typically high powered, such as FM radio, hence a Federal Communications Commission (FCC) license is needed. However, the VHF radio transceiver 241 can be driven with less 100 milliwatts (mW) of power, which does not require an FCC license. At VHF frequencies, the human body radiates energy. In contrast, with UHF frequencies (e.g., Bluetooth® or WiFi) the human body absorbs RF energy, which causes temperature rise, meaning UHF is not that great from a physical and scientific standpoint, but is freely provided by the FCC.

Diamagnetic material 305 of magnetic coupler 120 is formed into a half circle, half toroid, or U-block shape. A half circle shape allows the VHF transmission or reception terminal (element 560 of FIGS. 5A-C), which has a termination surface, to be flat against and flush with the tissue of the user 360 on the head of the human body. Diamagnetic material 305 can shaped into a third or quarter circle (or other fraction), for example, but needs to be machined to match the shape of the tissue of the user 360. For fast coupling, the diamagnetic material 305 typically touches skin tissue of the user 360 without causing a feeling that the diamagnetic material 305 is biting into the skin tissue of the user 360. As used herein, U-block shape means a curved body with two lateral arms. One of the ends of the arms of the U-block includes the VHF transmission or reception terminal (element 560 of FIGS. 5A-C). The shape of the diamagnetic material 305 does not have to be curved, e.g., can be like a cube which is hollowed out and cut into two or a half polygon that is hollowed to allow wrapping around, or other fraction or portion thereof.

A low power microcontroller of the VHF radio transceiver 241 of the receiving human body 405A reads a converted DC signal, which is generated by the envelope detector (element 242 of FIG. 2B) from the received VHF energy waves, such as received electric fields 436A-D. In one example, the envelope detector (element 242 of FIG. 2B) includes circuitry, such as a rectifier circuit that comprises a diode detector, a capacitor, and a resistor; and the lower power microcontroller reads the converted DC signal. If the converted DC signal is strong enough, VHF radio transceiver 241 demodulates data from the corresponding VHF waves. If the DC signal is not strong enough, the corresponding VHF waves are discarded by the VHF radio transceiver 241. The VHF radio signal comes in through the magnetic coupler opening 115 in the right temple 125B, then travels to the receiving magnetic coupler 120B, including the driven element 310 and then to the diode of envelope detector (element 242 of FIG. 2B). Diode detects the peak of the sinusoidal VHF radio signal and converts the sinusoidal VHF radio signal into a DC signal, which is the peak. Diode is coupled to the capacitor to detect the peak, and the stronger the sinusoidal signal, the higher the DC signal output from the rectifier circuit. Microcontroller then interrogates the DC signal output to determine whether VHF radio transceiver 241 should demodulate into data. For example, a DC signal of one millivolts is discarded, but ½ volt is processed because it means human bodies 405A-B are fist-bumping 400A or handshaking 400B.

In one example, a front end of the VHF radio transceiver 241 of eyewear device 100A sends an extremely low power signal that is modulated with the wearer's (first human body 405A) user identifier transmitting magnetic coupler 120A. The magnetic coupler 120A can include a half toroid shaped diamagnetic material formed ferrite to create time varying circumferential magnetic fields. Because of electromagnetic physics, time varying transmitted electrical fields 435A-D are generated along the height of the human body are from these circumferential magnetic fields. The induced transmitted electrical fields 435A-D then radiate off the first human body 405A. When transmitted electrical fields 435A-D come in contact with another human body, such as the second human body 405B the coupling is maximized. The result is creation of secondary time varying electric fields on the person who contacted the transmitting individual, shown as the received electrical fields 436A-D, on the second human body 405B. These time varying electric fields in turn create a time varying magnetic field, which is picked up by the ferrite based half toroid magnetic coupler 120B of the receiving eyewear device 100B worn on the second human body 405B. The incident magnetic field generates a current and wakes up the receiver circuit of the VHF radio transceiver 241, which demodulates the VHF radio signal to obtain the user identifier that was transmitted by the first human body 405A. The transmitted data is not limited to user identifiers, and may various data types and content, such as video, pictures, audio, etc.

Figure 5A:
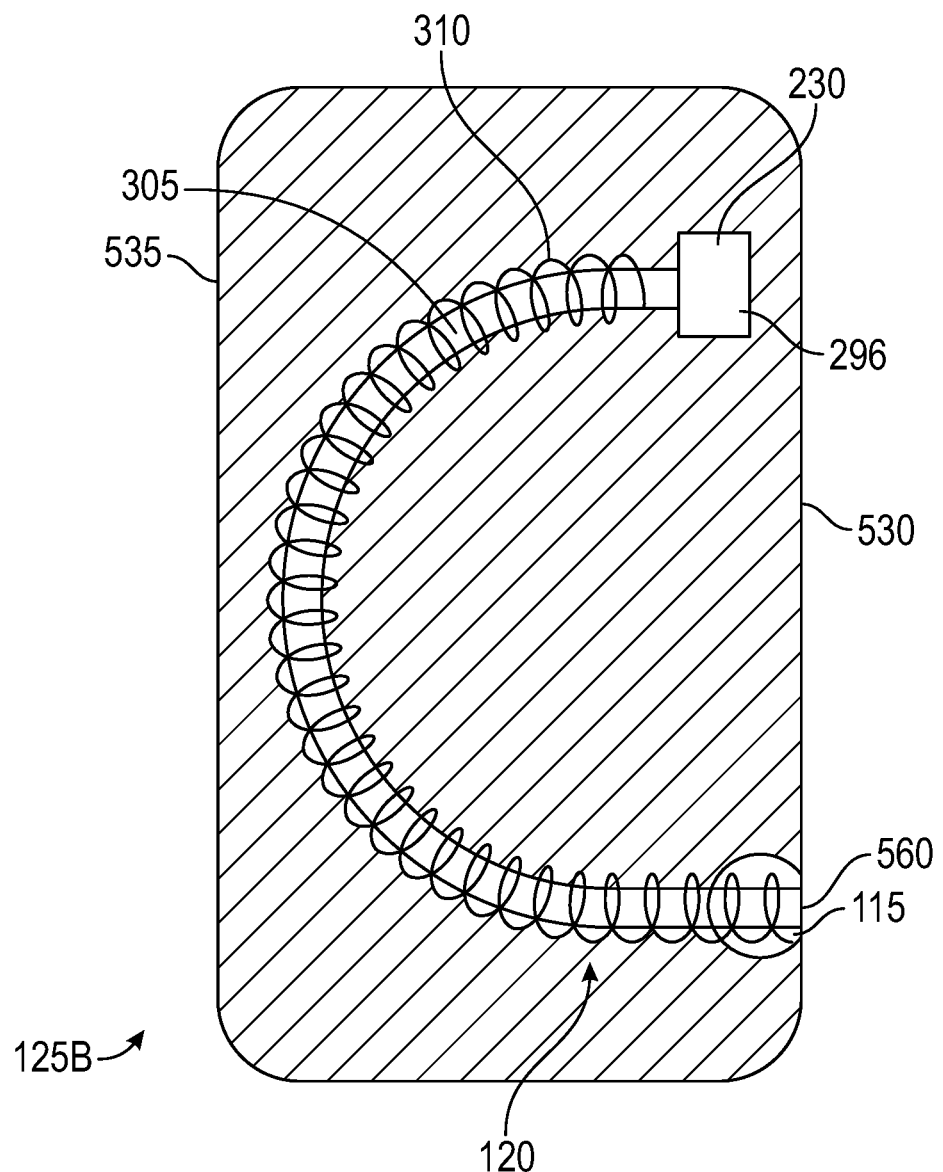
FIG. 5A is a cross-sectional view taken through the magnetic coupler and the temple of the eyewear device of FIGS. 1A and 2A-B.

FIG. 5A is a cross-sectional view taken through the magnetic coupler 120 and the temple of the eyewear device of FIGS. 1A and 2A-B. As shown, the magnetic coupler opening 115 is placed on the inner side, shown as inward facing surface 530, of the right temple 125B or the bridge (element 106 of FIG. 1B) of eyewear device 100, to enhance coupling with the wearer of the eyewear device 100. Magnetic coupler 120 creates circumferential magnetic fields on the human head that in turn induce longitudinal electric fields on the human body. Magnetic coupler 120 can operate at VHF band and is connected to a low power VHF transceiver 241, for example, with an output power less than 100 milliwatts of power (Pout<100 mW). Magnetic coupler 120 is made from a material with high permeability (mu>10) and has the shape of a half circle, half toroid, or a U-block. In some implementations, magnetic coupler opening 115 may be formed in the outward facing surface 535, for example, applications in which high power consumption is permitted and highly efficient coupling to the human body is not as desirous (e.g., broadcasting data to many users wearing eyewear devices 100A-N).

During transmission, the magnetic coupler 120 radiates the transmitted VHF band radio modulated signals 230 as circumferential magnetic fields (element 335A-D of FIG. 3) at the RF transmission or reception terminal 560, which cause longitudinal transmitted electric fields (elements 435A-D of FIGS. 4A-B) in the first human body (element 405A of FIGS. 4A-B). During reception, the magnetic coupler 120 absorbs the received VHF band radio modulated signals 230 as longitudinal received electric fields (element 436A-D of FIGS. 4A-B) in the second human body (element 405B of FIGS. 4A-B) at the RF transmission or reception terminal 560.

As shown in FIG. 5A, diamagnetic material 305 is shaped into a half toroid in the right temple 125B, which enables the human body to be utilized as a conduit (e.g., feed system) or antenna for VHF signals. The human body is not very conductive (e.g., conductive energy is reflected back), but the diamagnetic material 305 with high permeability (e.g., ferrite) can adjust the VHF electromagnetic energy from the RF output (element 225 of FIG. 2A) to be orthogonal to the human body at the VHF transmission or reception terminal 560. VHF transmission or reception terminal 560 then couples the VHF energy to the tissue of the user 360. Typically, high permeability means 10 mu or greater. Permeability is the ability of the diamagnetic material 305 to hold on to a magnetic field. Diamagnetic material 305 may be formed of, among other things, ferrite, which includes ceramic with mixed oxide and iron. Iron increases permeability and is not conductive, but has a high ability to hold on to the magnetic field.

Figure 5B:
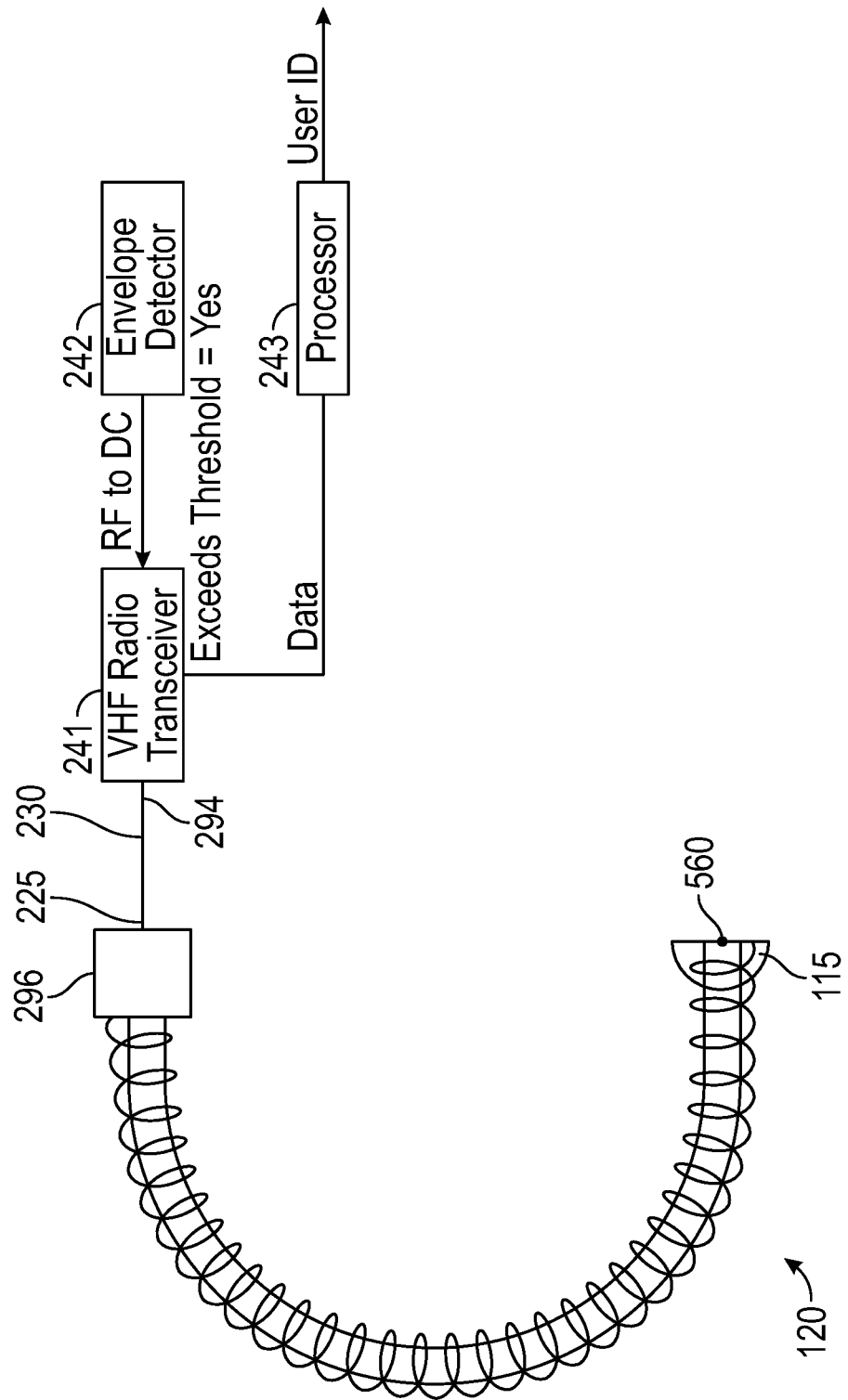
FIG. 5B shows operation and a circuit diagram of the magnetic coupler of FIGS. 1A-C and 2A-B, the VHF radio transceiver, the envelope detector, and the processor during reception of RF signals.

Driven element 310 includes an electrically conductive coil connected to the VHF radio transceiver 241 via the RF output 225, which can include an RF strip line to receive radio input. RF signal 230 comprises sinusoidal alternating current (AC) waves, alternating between positive and negative. Driven element 310 is connected to the VHF radio transceiver 241 and, during transmission mode as shown in FIG. 5C, current flows in and through the driven element 310 by entering from one side (e.g., conductive pad 296) and exiting through the other side (e.g., VHF transmission or reception terminal 560). The current flows in reverse during reception mode, as shown in FIG. 5B. Because driven element 310 includes a conductive coil, the driven element 310 creates a high variance magnetic field. After passing through the magnetic coupler 120, the magnetic field goes from the top of the paper to the bottom of the paper such that the magnetic field parallel to page. The ferrite forming the diamagnetic material 305 can be a half toroid or U-shape to confines and trap VHF radio energy inside. When VHF radio energy enters the magnetic coupler 120 at the conductive pad 296, the magnetic field is parallel, and when the magnetic field exits at the VHF transmission or reception terminal 560 and passes through the magnetic coupler opening 115, the magnetic fields are orthogonal to the paper. Once the magnetic fields are coupled to the human body, the entire human body radiates VHF radio waves, and the human body behaves like a monopole or dipole antenna.

As noted above, the RF signal 230 enters in through the coil of driven element 310, which is coupled to the ferrite half toroid shaped diamagnetic material 305. Ferrite can be deposited in the eyewear device 100, but is typically a three dimensional structure that is cut in half and then embedded inside plastic of the left or right temples 125A-B of the eyewear device 100 or in the left or right nose pads 116A-B of bridge 106. Driven element 310 is soldered on the flexible PCB (element 240 of FIG. 2B) and the ferrite diamagnetic material 305 is held in place by a plastic molding around it. The driven element 310 is formed of metal and soldered, but since ferrite is nonconductive, it is not soldered. The coil of driven element 310 wraps around the diamagnetic material 305 (e.g., half toroid shape) along the entire half toroid shape, but driven element 310 can be squeezed in the middle of the diamagnetic material 305 in some examples. Hence, while the diamagnetic material 305 goes through the inside of the driven element 310 in the example, this can be switched so that the driven element 310 is inside the diamagnetic material 305. Having the driven element 310 inside the diamagnetic material 305 may be more difficult to manufacture, but improves VHF coupling efficiency.

When the RF signal 230 flows through the driven element 310 during transmission, the RF signal is confined inside the diamagnetic material 305. The magnetic field changes shape when passing through the diamagnetic material 305 because when wrapping around the coil of driven element 310, the magnetic field has to follow the shape of the half toroid shaped diamagnetic material 305 (e.g., ferrite). Thus, the magnetic fields become orthogonal to the human head. Hence, the diamagnetic material 305 behaves like a circuit and the magnetic fields have to exit and go to the other side where the diamagnetic material 305 touches human skin at the VHF transmission or reception terminal 560 through the magnetic coupler opening 115. The only way magnetic fields can exit the magnetic coupler 120 is to flow through the human body.

FIG. 5B shows operation and a circuit diagram of the magnetic coupler 120 of FIGS. 1A-C and 2A-B, the VHF radio transceiver 241, the envelope detector 242, and the processor 243 during reception of RF signals 230, such as VHF band radio modulated signals. Magnetic coupler 120 absorbs received VHF band radio modulated signals as longitudinal magnetic fields at the RF transmission or reception terminal 560. For example, the tissue of the user (element 360 of FIG. 3) that absorbs the received VHF band radio modulated signals is on a head of a human body (element 405B of FIGS. 4A-B). Received VHF band radio modulated signals absorbed by the magnetic coupler 120 propagate through an RF output 225 line to the VHF radio transceiver 241. As noted previously, the RF output 225 line includes electrical interconnect(s) 294, electrically conductive trace(s) 295, and electrically conductive pad(s) 296 to convey RF signals 230, such as the received VHF band radio modulated signals.

Envelope detector circuit 242 is integrated into or connected to the VHF radio transceiver 241 and connected to the processor 243. In an example, the envelope detector 242 is configured to detect a peak of a sinusoid of the received VHF band radio modulated signals. For example, the envelope detector circuit 242 includes a rectifier circuit to convert the sinusoid of the received VHF band radio modulated signals into a direct current (DC) output signal. In the example of FIG. 5B, the VHF radio transceiver 241 actually includes an internal microcontroller that is separate from processor 243. The microcontroller of the VHF radio transceiver 241 interrogates the DC output signal by comparing the converted DC output signal to a DC threshold to determine whether the received VHF band radio modulated signals are intended for the user. In response to determining the DC output signal satisfies the DC threshold meaning the received VHF band radio modulated signals are intended for the user, the VHF radio transceiver 241 demodulates the received VHF band radio modulated signals into data during reception. VHF radio transceiver 241 then conveys the demodulated data to the processor 243. Processor 243 then converts the received data into a user identifier.

In other examples, VHF radio transceiver 241 may not include the separate microcontroller and processor 243 itself may interrogate the converted DC output signal and determine whether the VHF band radio modulated signals 230 are intended for the user. In the example, VHF radio transceiver 241 is a low power FM transceiver that operates at less than 100 milliwatts. Envelope detector 242 allows the VHF radio transceiver 241 to turn on and demodulate VHF band radio modulated signals when the incident current and voltage exceeds certain thresholds. These thresholds can correspond to coupling levels that occur when two human bodies 405A-B fist bump 400A, shake hands 400B, or engage in other skin-to-skin contact (e.g., hug or kiss).

FIG. 5C shows operation and a circuit diagram of the magnetic coupler of FIGS. 1A-C and 2A-B, the VHF radio transceiver 241, the envelope detector 242, and the processor 243 during transmission of RF signals 230. The operation, such as the conveying of RF signals is like that of the reception mode of FIG. 5B, but in reverse. However, the envelope detector 242 is not utilized during the transmission mode.

As shown, the processor 243 conveys a user identifier for modulation into an RF signal 230. The RF signal 230 is conveyed via the RF output line 225, which includes electrical interconnect 294, conductive trace 295, and electrically conductive pad 296 to the magnetic coupler 120. During transmission, the radiated circumferential magnetic fields (elements 335A-D of FIG. 3) from the VHF transmission or reception terminal 560 induce longitudinal electric fields (elements 435A-D of FIGS. 4A-B) in the tissue of the user (element 360 of FIG. 3). For example, the tissue of the user 360 is on a head of a human body (element 405A of FIGS. 4A-B). During transmission, the magnetic coupler 120 radiates circumferential magnetic fields (elements 335A-D of FIG. 3) at the RF transmission or reception terminal 560 on the head. The magnetic fields 335A-D are initially parallel but then bend as the magnetic fields 335A-D become perpendicular to the human body 405A and circumferential. Hence, the length of the human body 405A can become a VHF conduit (e.g., analogous to a line feed) or an antenna, in some examples. If the magnetic coupler 120 is rotated 90 degrees, the girth or circumference of the human body will radiate VHF radio energy. However, generally humans are taller than they are wide, so the depicted orientation of the magnetic coupler 120 provides better magnetic coupling efficiency.

Figure 6:
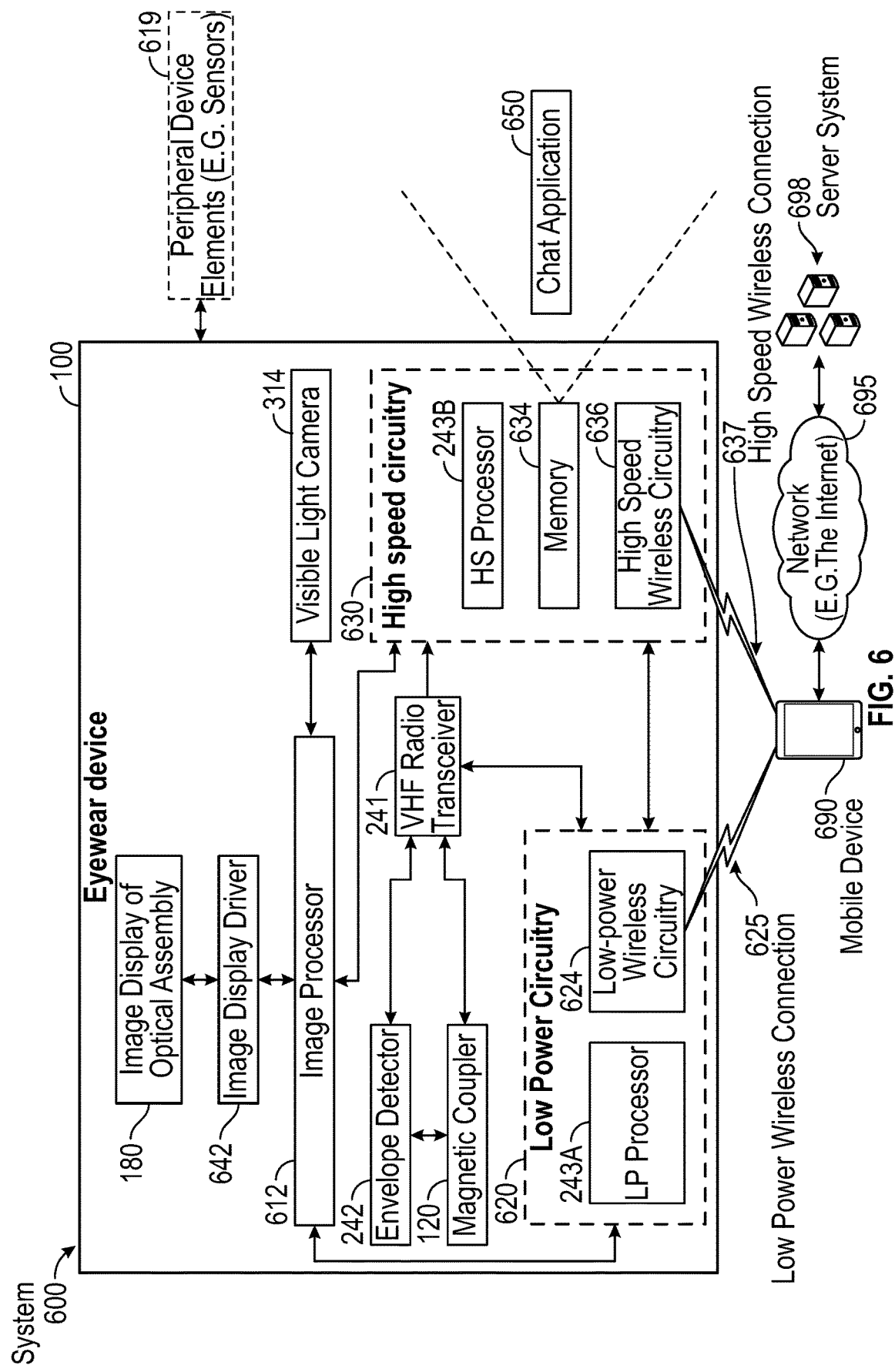
FIG. 6 is a high-level functional block diagram of an example magnetic coupler system including the eyewear device, a mobile device, and a server system connected via various networks.

FIG. 6 is a high-level functional block diagram of an example magnetic coupler system 600. The magnetic coupler system 600 includes eyewear device 100, mobile device 690, and server system 698. Mobile device 690 may be a smartphone, tablet, laptop computer, access point, or any other such device capable of connecting with eyewear device 100 using both a low-power wireless connection 625 and a high-speed wireless connection 637. Mobile device 690 is connected to server system 698 and network 695. The network 695 may include any combination of wired and wireless connections.

Server system 698 may be one or more computing devices as part of a service or network computing system, for example, that include a processor, a memory, and network communication interface to communicate over the network 695 with the mobile device 690 and eyewear device 100. The memory of the server system 698 can include user identifiers or other data transmitted or received by the magnetic coupler 120 of the eyewear device 100, and then sent via the depicted networks 625, 637, 695. The memory of the server system 698 can also include a database of user identifiers for users of the chat application 650 to perform functions of the programming described herein that utilize the VHF radio transceiver 241 and magnetic coupler 120 to exchange user identifiers or other data (e.g., images, videos, audio). Chat application 650 may transmit received user identifiers to a host computer (e.g., mobile device 690 and server system 698) to retrieve profile information based on the received user identifier. For example, when a user of the eyewear device 100 receives a user identifier via a handshake or a fist bump, the chat application 650 may request that the server system 698 resolve the user identifier to a particular username.

Figure 7:
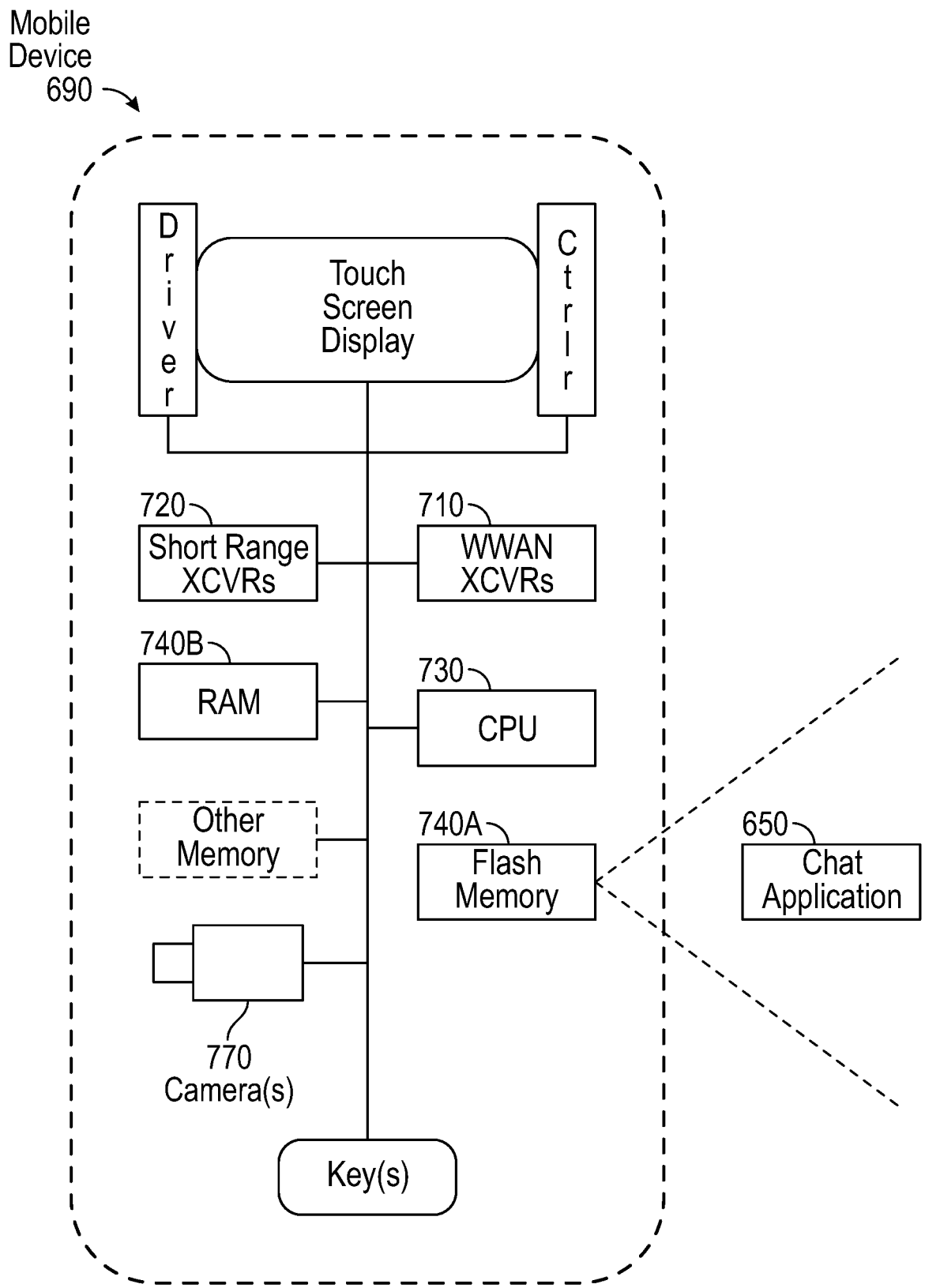
FIG. 7 shows an example of a hardware configuration for the mobile device of the magnetic coupler system of FIG. 6, in simplified block diagram form.

Mobile device 690 and elements of network 695, low-power wireless connection 625, and high-speed wireless architecture 637 may be implemented using details of the architecture of mobile device 690, for example utilizing the short range XCVRs and WWAN XCVRs of mobile device 690 described in FIG. 7.

Low-power wireless circuitry 624 and the high-speed wireless circuitry 636 of the eyewear device 100 can include short range transceivers (Bluetooth®) and wireless wide, local, or wide area network transceivers (e.g., cellular or WiFi). Mobile device 690, including the transceivers communicating via the low-power wireless connection 625 and high-speed wireless connection 637, may be implemented using details of the architecture of the eyewear device 100, as can other elements of network 695.

Output components of the eyewear device 100 include visual components, such as the image display of the optical assembly 180 as described in FIGS. 1B-C (e.g., a display such as a liquid crystal display (LCD), a plasma display panel (PDP), a light emitting diode (LED) display, or a projector). The image display of the optical assembly 180 is driven by the image display driver 642. The output components of the eyewear device 100 further include acoustic components (e.g., speakers), haptic components (e.g., a vibratory motor), other signal generators, and so forth. The input components of the eyewear device 100 and various components of the system, including the mobile device 690 and server system 698, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

System 600 may optionally include additional peripheral device elements 619. Such peripheral device elements 619 may include biometric sensors, additional sensors, or display elements integrated with eyewear device 100. For example, peripheral device elements 1119 may include any I/O components including output components, motion components, position components, or any other such elements described herein.

For example, the biometric components of the system include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WiFi or Bluetooth® transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over wireless connections 625 and 637 from the mobile device 690 via the low-power wireless circuitry 624 or high-speed wireless circuitry 636

Eyewear device 100 includes visible light camera 314, image display of the optical assembly 180, VHF radio transceiver 241, envelope detector 242, processor 243, image processor 612, low-power circuitry 620, and high-speed circuitry 630. Image processor 612 includes circuitry to receive signals from the visible light camera 314 and process those signals from the visible light camera 314 into a format suitable for storage in the memory 834. The components shown in FIG. 6 for the eyewear device 100 are located on one or more circuit boards, for example a PCB or flexible PCB, in the temples 125A-B. Alternatively or additionally, the depicted components can be located in the chunks 110A-B, frame 105, hinges 126A-B, or bridge 106 of the eyewear device 100. Visible light camera 314 can include digital camera elements such as a complementary metal-oxide-semiconductor (CMOS) image sensor, charge coupled device, a lens, or any other respective visible or light capturing elements that may be used to capture data.

Memory 634 includes various received user identifiers, the user identifier of the wearer of the eyewear device 100, and a chat application 650. Chat application 650 performs functions to transmit or receive via the magnetic coupler 120, such as to exchange user identifiers, e.g., during a handshake or fist bump, as outlined herein. Chat application 650 stored on the eyewear device 100 and mobile device 690 may be executed by a processor 243A-B of the eyewear device 100 or the mobile device 690 and utilize the corresponding user account information to post or send images and videos captured by the visible light camera 314 of the eyewear device 100 to the user's account and deliver the images and videos captured by the visible light camera 314 to contacts or associated groups of the verified user in the chat application 650 (e.g., as a result of exchanging user identifiers via magnetic coupler 120). It should be understood that various other types of applications may user the magnetic coupler 120 for user identifier transmission and the transmitted data can be any type of data, not just user identifiers, e.g., audio, video, images, etc. Although the above example describes exchanging user identifiers to obtain the identity of a user (e.g., a contact) as knowing their identity or identifying an associated user account, some embodiments can include transmitting images and videos captured by the visible light to camera 314 via the magnetic coupler 120 to another user's eyewear device 100B during a handshake or fist bump. Although shown as an application, it should be understood that the chat application 650 can be part of the operating system stored in the memory 634 of the eyewear device 100 that provides an application programming interface (API) which is responsive to calls from other applications.

Image processor 612, VHF radio transceiver 241, and envelope detector 242 are structured within eyewear device 100 such that the components may be powered on and booted under the control of low-power circuitry 620. Image processor 612, VHF radio transceiver 241, and envelope detector 242 may additionally be powered down by low-power circuitry 620. Depending on various power design elements associated with image processor 612, VHF radio transceiver 241, and envelope detector 242, these components may still consume a small amount of power even when in an off state. This power will, however, be negligible compared to the power used by image processor 612, VHF radio transceiver 241, and envelope detector 242 when in an on state, and will also have a negligible impact on battery life. As described herein, device elements in an "off" state are still configured within a device such that low-power processor 243A is able to power on and power down the devices. A device that is referred to as "off" or "powered down" during operation of eyewear device 100 does not necessarily consume zero power due to leakage or other aspects of a system design.

In one example embodiment, image processor 612 comprises a microprocessor integrated circuit (IC) customized for processing sensor data from the visible light camera 314, along with volatile memory used by the microprocessor to operate. In order to reduce the amount of time that image processor 612 takes when powering on to processing data, a non-volatile read only memory (ROM) may be integrated on the IC with instructions for operating or booting the image processor 612. This ROM may be minimized to match a minimum size needed to provide basic functionality for gathering sensor data from visible light camera 314, such that no extra functionality that would cause delays in boot time are present. The ROM may be configured with direct memory access (DMA) to the volatile memory of the microprocessor of image processor 612. DMA allows memory-to-memory transfer of data from the ROM to system memory of the image processor 612 independent of operation of a main controller of image processor 612. Providing DMA to this boot ROM further reduces the amount of time from power on of the image processor 612 until sensor data from the image processor 612, VHF radio transceiver 241, and envelope detector 242 can be processed and stored. In certain embodiments, minimal processing of the camera signal from the visible light camera 314 is performed by the image processor 612, and additional processing may be performed by applications operating on the mobile device 690 or server system 698.

Low-power circuitry 620 includes low-power processor 243A and low-power wireless circuitry 624. These elements of low-power circuitry 620 may be implemented as separate elements or may be implemented on a single IC as part of a system on a single chip. Low-power processor 243A includes logic for managing the other elements of the eyewear device 100. Low-power processor 243A may also be configured to receive input signals or instruction communications from mobile device 690 via low-power wireless connection 625. Additional details related to such instructions are described further below. Low-power wireless circuitry 624 includes circuit elements for implementing a low-power wireless communication system via a short-range network. Bluetooth® Smart, also known as Bluetooth® low energy, is one standard implementation of a low power wireless communication system that may be used to implement low-power wireless circuitry 624. In other embodiments, other low power communication systems may be used.

High-speed circuitry 630 includes high-speed processor 243B, memory 634, and high-speed wireless circuitry 636. VHF radio transceiver 241 and envelope detector 242 can be coupled to the low-power circuitry 620 and operated by the low-power processor 243B. However, it should be understood that in some examples the VHF radio transceiver 241 and envelope detector 242 can be coupled to the high-speed circuitry 630 and operated by the high-speed processor 243B. In the example, the image display driver 642 is coupled to the high-speed circuitry 630 and operated by the high-speed processor 243B in order to drive the image display of the optical assembly 180.

High-speed processor 243B may be any processor capable of managing high-speed communications and operation of any general computing system needed for eyewear device 100. High speed processor 243B includes processing resources needed for managing high-speed data transfers on high-speed wireless connection 637 to a wireless local area network (WLAN) using high-speed wireless circuitry 636. In certain embodiments, the high-speed processor 243B executes an operating system such as a LINUX operating system or other such operating system of the eyewear device 100 and the operating system is stored in memory 634 for execution. In addition to any other responsibilities, the high-speed processor 243B executing a software architecture for the eyewear device 100 is used to manage data transfers with high-speed wireless circuitry 636. In certain embodiments, high-speed wireless circuitry 636 is configured to implement Institute of Electrical and Electronic Engineers (IEEE) 602.11 communication standards, also referred to herein as Wi-Fi. In other embodiments, other high-speed communications standards may be implemented by high-speed wireless circuitry 636.

Memory 634 includes any storage device capable of storing various data and applications, including, among other things, the depicted the user identifiers, chat application 650, camera data generated by the visible light camera 314 and the image processor 612, as well as images generated for display by the image display driver 642 on the image display of the optical assembly 180. While memory 634 is shown as integrated with high-speed circuitry 630, in other embodiments, memory 634 may be an independent standalone element of the eyewear device 100. In certain such embodiments, electrical routing lines may provide a connection through a chip that includes the high-speed processor 243B from the image processor 612 or low-power processor 243A to the memory 634. In other embodiments, the high-speed processor 243B may manage addressing of memory 634 such that the low-power processor 243A will boot the high-speed processor 243B any time that a read or write operation involving memory 634 is needed.

As noted above, eyewear device 100 may include cellular wireless network transceivers or other wireless network transceivers (e.g., WiFi or Bluetooth®), and run sophisticated applications. Some of the applications may include email application, phone application to place phone calls, web browser application to navigate the Internet, banking application, video or image codecs to watch videos or interact with pictures, codecs to listen to music, a turn-by-turn navigation application, an augmented or virtual reality application, etc.

In an example of reception mode, the eyewear device 100 is connected to a mobile device 690 via a network 625 or 637, for example, the network is a wireless short-range network 625 or a wireless local area network 637. Execution of the programming (chat application 650) by the processor 243A-B configures the eyewear device 100 to perform further functions, including functions to receive, via the network 625 or 637, from the mobile device 690 a user identifier of the user. Execution of the programming (chat application 650) by the processor 243A-B further configures the eyewear device 100 to store the user identifier in the memory 634. Execution of the programming (chat application 650) by the processor 243A-B further configures the eyewear device 100 to modulate, via the VHF radio transceiver 241, the VHF band radio carrier signal with the user identifier to generate the transmitted VHF band radio modulated signals during transmission.

In an example of transmission mode, the eyewear device 100 is connected to a mobile device 690 via a network 625 or 637, for example, the network is a wireless short-range network 625 or a wireless local area network 637. Execution of the programming (chat application 650) by the processor 243A-B configures the eyewear device 100 to perform further functions, including functions to demodulate, via the VHF radio transceiver 241, the received VHF band radio modulated signals into a user identifier during reception. Execution of the programming (chat application 650) by the processor 243A-B further configures the eyewear device 100 to transmit, via the network 625 or 637, to the mobile device the user identifier to the mobile device.

Although described in terms of eyewear device 100, it should be understood that other wearable devices and mobile device 690 can incorporate the magnetic coupler 120, magnetic coupler opening 115, VHF radio transceiver 241, envelope detector 242, etc. in a manner similar to the eyewear device 100. For example, the wearable device or mobile device 690 includes a frame and a magnetic coupler opening 120 formed in the frame. Wearable device or mobile device 690 further includes a processor 243A-B, a memory 634 accessible to the processor, and a very high frequency (VHF) radio transceiver for data transmission and reception and connected to the processor. VHF radio transceiver 241 includes a transmitter to modulate a VHF band radio carrier signal with data to generate transmitted VHF band radio modulated signals during transmission. VHF radio transceiver 241 further includes a receiver to demodulate received VHF band radio modulated signals into data during reception. Wearable device or mobile device 690 further includes a magnetic coupler 120 connected to the VHF radio transceiver 241.

Magnetic coupler 120 includes a diamagnetic material 305 shaped to form a VHF transmission or reception terminal 560 that partially or fully aligns with the magnetic coupler opening 115. During transmission, magnetic coupler 120 is configured to radiate the transmitted VHF band radio modulated signals into tissue of the user 360. During reception, magnetic coupler 120 is configured to absorb the received VHF band radio modulated signals from the tissue of the user 360. Wearable device or mobile device 690 further includes a memory 634 accessible to the processor 243A-B and programming in the memory 634. Magnetic coupler 120 includes a driven element 310 and the driven element 310 connects to the diamagnetic material 305. Diamagnetic material 305 has a high magnetic permeability, which is greater than 10 mu and the diamagnetic material 305 is shaped to form a fraction of a toroid, polyhedron, ellipsoid, or other quadric surface that is typically solid. Diamagnetic material 305 can be shaped with a hollow interior cavity space 311 to allow wrapping of driven element 310 (e.g., hollow interior cavity space 311 is a donut hole in the half-toroid example). For example, the diamagnetic material 305 includes ferrite, the driven element 310 includes a conductive coil, which wraps around the ferrite, and the ferrite is shaped to form a half toroid. The RF transmission or reception terminal 560 extends through the magnetic coupler opening 115 to contact the tissue of the user 360.

As described, the disclosed VHF band technology offers certain benefits that is hard to accomplish at UHF band, specifically in the areas of power consumption and electrical design simplicity. An RF front end (RFFE) like the VHF radio transceiver 241 optimized to operate in the VHF band that is more efficient than the one optimized in the UHF band (such as WiFi or Bluetooth®) due to the electrical characteristics of modern semiconductors. While the VHF spectrum is more crowded and the bandwidth is more limited compared to UHF bands, low power transmission of radio signals, such as in the FM band, which ranges from approximately 87.5 MHz to 108.0 MHz, in 200 kHz steps, can be utilized in several examples by the VHF radio transceiver 241 and magnetic coupler 120. The magnetic coupler 120 of eyewear device 100 utilizes the human body to work as a VHF conduit (e.g., analogous to a line feed) or antenna when properly connected to the VHF radio transceiver 241, and is more power efficient than other popular technologies like Bluetooth® or WiFi.

Coupling between the human body and the RFFE of the VHF radio transceiver 241 in the eyewear device 100 is made as strong as possible to maximize the system efficiency. In one example, the magnetic coupler 120 is comprised of diamagnetic material 305 that is a half-toroid structure made out of ferrite material with low loss and high permeability. Open tips of the toroid shaped diamagnetic material 305, such as the VHF transmission or reception terminal 560, can touch the skin or other tissue of the user 360. This design enables the VHF magnetic fields to be captured by the half toroid shaped magnetic coupler 120 at maximum efficiency. Due to the high permeability of ferrite material, the disclosed design locks the magnetic fields inside, reduces leakage, and delivers the maximum energy to the front end of the VHF radio transceiver 241. The ideal design can be a half toroid; however, a U-shaped structure also works as intended. The surface area of the ferrite toroid diamagnetic material 305 where it touches the skin tissue of the user 360 can be as large as possible to extract the maximum amount of VHF signal from the human body. In addition, the number of turns a driven element 310 (e.g., conductive coil) can be maximized to optimize the coupling efficiency. There are some limitations from the industrial design and usability perspectives so a tradeoff will be made in the final design between size and best fit of the eyewear device 100.

FIG. 7 shows an example of a hardware configuration for the mobile device 690 of the magnetic coupler system 600 of FIG. 6, in simplified block diagram form. The mobile device 690 can incorporate the magnetic coupler 120, magnetic coupler opening 115, VHF radio transceiver 241, envelope detector 242 in a manner similar to the eyewear device 100 previously described. Shown are elements of a touch screen type of mobile device 690 having a chat application 650 loaded, although other non-touch type mobile devices can be used in the user authorization communications and controls under consideration here. Examples of touch screen type mobile devices that may be used include (but are not limited to) a smart phone, a personal digital assistant (PDA), a tablet computer, a laptop computer, or other portable device. However, the structure and operation of the touch screen type devices is provided by way of example; and the subject technology as described herein is not intended to be limited thereto. For purposes of this discussion, FIG. 7 therefore provides a block diagram illustration of the example mobile device 690 having a touch screen display for displaying content and receiving user input as (or as part of) the user interface. Mobile device 690 also includes a camera(s) 770, such as visible light camera(s).

The activities that are the focus of discussions here typically involve data communications. As shown in FIG. 7, the mobile device 690 includes at least one digital transceiver (XCVR) 710, shown as WWAN XCVRs, for digital wireless communications via a wide area wireless mobile communication network. The mobile device 690 also includes additional digital or analog transceivers, such as short range XCVRs 720 for short-range network communication, such as via NFC, VLC, DECT, ZigBee, Bluetooth®, or WiFi. For example, short range XCVRs 720 may take the form of any available two-way wireless local area network (WLAN) transceiver of a type that is compatible with one or more standard protocols of communication implemented in wireless local area networks, such as one of the Wi-Fi standards under IEEE 802.11 and WiMAX.

To generate location coordinates for positioning of the mobile device 690, the mobile device 690 can include a global positioning system (GPS) receiver. Alternatively, or additionally the mobile device 690 can utilize either or both the short range XCVRs 720 and WWAN XCVRs 710 for generating location coordinates for positioning. For example, cellular network, WiFi, or Bluetooth® based positioning systems can generate very accurate location coordinates, particularly when used in combination. Such location coordinates can be transmitted to the eyewear device 100 over one or more network connections via XCVRs 720.

The transceivers 710, 720 (network communication interface) conforms to one or more of the various digital wireless communication standards utilized by modern mobile networks. Examples of WWAN transceivers 710 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 710, 720 provide two-way wireless communication of information including digitized audio signals, still image and video signals, web page information for display as well as web related inputs, and various types of mobile message communications to/from the mobile device 690 for user identification strategies.

Several of these types of communications through the transceivers 710, 720 and a network, as discussed previously, relate to protocols and procedures in support of communications with the eyewear device 100 or the server system 698 for user identification. Such communications, for example, may transport packet data via the short range XCVRs 720 over the wireless connections 625 and 637 to and from the eyewear device 100 as shown in FIG. 6. Such communications, for example, may also transport data utilizing IP packet data transport via the WWAN XCVRs 710 over the network (e.g., Internet) 695 shown in FIG. 6. Both WWAN XCVRs 710 and short range XCVRs 720 connect through radio frequency (RF) send-and-receive amplifiers (not shown) to an associated antenna (not shown).

The mobile device 690 further includes a microprocessor, shown as CPU 730, sometimes referred to herein as the host controller. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The processor 730, for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU 730 or processor hardware in smartphone, laptop computer, and tablet.

The microprocessor 730 serves as a programmable host controller for the mobile device 690 by configuring the mobile device 690 to perform various operations, for example, in accordance with instructions or programming executable by processor 730. For example, such operations may include various general operations of the mobile device, as well as operations related to user identifier communications with the eyewear device 100 and server system 698. Although a processor may be configured by use of hardwired logic, typical processors in mobile devices are general processing circuits configured by execution of programming.

The mobile device 690 includes a memory or storage device system, for storing data and programming. In the example, the memory system may include a flash memory 740A and a random access memory (RAM) 740B. The RAM 740B serves as short term storage for instructions and data being handled by the processor 730, e.g. as a working data processing memory. The flash memory 740A typically provides longer term storage.

Hence, in the example of mobile device 690, the flash memory 740A is used to store programming or instructions for execution by the processor 730. Depending on the type of device, the mobile device 690 stores and runs a mobile operating system through which specific applications, including chat application 650. Applications, such as the chat application 650, may be a native application, a hybrid application, or a web application (e.g., a dynamic web page executed by a web browser) that runs on mobile device 690. Examples of mobile operating systems include Google Android, Apple iOS (I-Phone or iPad devices), Windows Mobile, Amazon Fire OS, RIM BlackBerry operating system, or the like.

It will be understood that the mobile device 690 is just one type of host computer in the magnetic coupler system 600 and that other arrangements may be utilized. Any of the data transmission or reception (e.g., exchange of user identifiers) functions described herein for the eyewear device 100, mobile device 690, and server system 698 can be embodied in on one or more methods as method steps or in one more applications as described previously. According to some embodiments, an "application," "applications," or "firmware" are program(s) that execute functions defined in the program, such as logic embodied in software or hardware instructions. Various programming languages can be employed to create one or more of the applications, structured in a variety of manners, such as object-oriented programming languages (e.g., Objective-C, Java, or C++) or procedural programming languages (e.g., C or assembly language). In a specific example, a third party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third-party application can invoke API calls provided by the operating system to facilitate functionality described herein. The applications can be stored in any type of computer readable medium or computer storage device and be executed by one or more general-purpose computers. In addition, the methods and processes disclosed herein can alternatively be embodied in specialized computer hardware or an application specific integrated circuit (ASIC), field programmable gate array (FPGA) or a complex programmable logic device (CPLD).

Program aspects of the technology may be thought of as "products" or "articles of manufacture" typically in the form of executable code and/or associated data that is carried on or embodied in a type of machine-readable medium. For example, programming code could include code for the utilizing the magnetic coupler 120, VHF radio transceiver 241, and envelope detector 242 for transmission of data (e.g., user identifiers, audio, video, images) as well as the chat application 650 or other functions described herein. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from the server system 698 or host computer of the service provider into the computer platforms of the eyewear device 100 and mobile device 690. Thus, another type of media that may bear the programming, media content or meta-data files includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to "non-transitory", "tangible", or "storage" media, terms such as computer or machine "readable medium" refer to any medium that participates in providing instructions or data to a processor for execution.

Hence, a machine-readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as +10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. An eyewear device including:
   a frame including a bridge;
   a temple connected to a lateral side of the frame;
   a magnetic coupler opening formed in the temple or the bridge;
   a processor;
   a memory accessible to the processor; and
   a very high frequency (VHF) radio transceiver for data transmission and reception and connected to the processor, including:
      a transmitter to modulate a VHF band radio carrier signal with data to generate transmitted VHF band radio modulated signals during transmission; and
      a receiver to demodulate received VHF band radio modulated signals into data during reception;
   a magnetic coupler connected to the VHF radio transceiver and including a diamagnetic material shaped to form a VHF transmission or reception terminal that partially or fully aligns with the magnetic coupler opening, the magnetic coupler configured to:
      during transmission, radiate the transmitted VHF band radio modulated signals into tissue of the user; and
      during reception, absorb the received VHF band radio modulated signals from the tissue of the user;
   the memory accessible to the processor; and programming in the memory
   wherein execution of the programming by the processor configures the eyewear device to perform functions, including functions to:
      modulate, via the VHF radio transceiver, the VHF band radio carrier signal with data to generate the transmitted VHF band radio modulated signals during transmission;
      during transmission, radiate, via the magnetic coupler, the transmitted VHF band radio modulated signals into the tissue of the user;
      during reception, absorb, via the magnetic coupler, the received VHF band radio modulated signals from the tissue of the user; and
      demodulate, via the VHF radio transceiver, the received VHF band radio modulated signals into data during reception.

2. The eyewear device of claim 1, wherein:
   the bridge is adapted to contact a nose of the user; and
   the temple is adapted to extend over an ear of the user.

3. The eyewear device of claim 1, wherein:
   the magnetic coupler includes a driven element;
   the driven element connects to the diamagnetic material;
   the diamagnetic material has a high magnetic permeability which is greater than 10 mu; and
   the diamagnetic material is shaped to form a fraction of a toroid, polyhedron, ellipsoid, or other quadric surface with a hollow interior cavity.

4. The eyewear device of claim 3, wherein:
   the diamagnetic material includes ferrite;
   the driven element includes a conductive coil which wraps around the ferrite; and
   the ferrite is shaped to form a half toroid.

5. The eyewear device of claim 3, further comprising:
   a chunk integrated into or connected to the frame on the lateral side;
   a flexible printed circuit board (PCB) mounted inside the chunk;
   wherein:
      the VHF radio transceiver and the processor are disposed on the flexible PCB; and
      the driven element of the magnetic coupler is electrically connected via one or more electrical interconnects, electrically conductive traces, or electrically conductive pads to the VHF radio transceiver.

6. The eyewear device of claim 1, wherein the VHF transmission or reception terminal extends through the magnetic coupler opening to contact the tissue of the user.

7. The eyewear device of claim 6, wherein:
   the bridge includes a nose pad adapted to contact a nose of the user; and
   the magnetic coupler opening is formed in the nose pad.

8. The eyewear device of claim 1, wherein the VHF transmission or reception terminal is air gapped with the tissue of the user.

9. The eyewear device of claim 1, wherein:
   during transmission, the magnetic coupler radiates the transmitted VHF band radio modulated signals as circumferential magnetic fields at the VHF transmission or reception terminal; and
   during reception, the magnetic coupler absorbs the received VHF band radio modulated signals as longitudinal electric fields at the VHF transmission or reception terminal.

10. The eyewear device of claim 9, wherein:
    during transmission, the radiated circumferential magnetic fields induce longitudinal electric fields in the tissue of the user.

11. The eyewear device of claim 9, wherein:
    the tissue of the user is on a head of a human body;
    during transmission, the magnetic coupler radiates circumferential magnetic fields at the transmission or reception terminal into the head; and
    during reception, longitudinal electric fields at the transmission or reception terminal induce circumferential magnetic fields in the magnetic coupler.

12. The eyewear device of claim 1, wherein:
    an envelope detector circuit integrated into or connected to the VHF radio transceiver and connected to the processor, the envelope detector configured to detect a peak of a sinusoid of the received VHF band radio modulated signals.

13. The eyewear device of claim 12, wherein:
    the VHF radio transceiver includes a microcontroller;
    the envelope detector circuit includes a rectifier circuit to convert the sinusoid of the received VHF band radio modulated signals into a direct current (DC) output signal; and
    the microcontroller of the VHF radio transceiver or the processor interrogates the DC output signal by:
       comparing the DC output signal to a DC threshold to determine whether the received VHF band radio modulated signals satisfies the DC threshold and is thus intended for the user; and
       in response to determining the DC output signal satisfies the DC threshold, demodulating, via the VHF radio transceiver, the received VHF band radio modulated signals into data during reception.

14. The eyewear device of claim 1, wherein the VHF radio transceiver operates at less than 100 milliwatts of power.

15. The eyewear device of claim 1, wherein:
    the eyewear device is connected to a mobile device via a network;
    the network is a wireless short-range network or a wireless local area network;

execution of the programming by the processor configures the eyewear device to perform further functions, including functions to:
- receive, via the network, from the mobile device a user identifier of the user;
- store the user identifier in the memory; and
- modulate, via the VHF radio transceiver, the VHF band radio carrier signal with the user identifier to generate the transmitted VHF band radio modulated signals during transmission.

16. The eyewear device of claim 1, wherein:
the eyewear device is connected to a mobile device via a network;
the network is a wireless short-range network or a wireless local area network;
execution of the programming by the processor configures the eyewear device to perform further functions, including functions to:
- demodulate, via the VHF radio transceiver, the received VHF band radio modulated signals into a user identifier during reception; and
- transmit, via the network, to the mobile device the user identifier to the mobile device.

17. A wearable device including:
a frame;
a magnetic coupler opening formed in the frame;
a processor;
a memory accessible to the processor; and
a very high frequency (VHF) radio transceiver for data transmission and reception and connected to the processor, including:
- a transmitter to modulate a VHF band radio carrier signal with data to generate transmitted VHF band radio modulated signals during transmission; and
- a receiver to demodulate received VHF band radio modulated signals into data during reception;
a magnetic coupler connected to the VHF radio transceiver and including a diamagnetic material shaped to form a VHF transmission or reception terminal that partially or fully aligns with the magnetic coupler opening, the magnetic coupler configured to:
- during transmission, radiate the transmitted VHF band radio modulated signals into tissue of the user; and
- during reception, absorb the received VHF band radio modulated signals from the tissue of the user;

the memory accessible to the processor; and programming in the memory
wherein execution of the programming by the processor configures the wearable device to perform functions, including functions to:
- modulate, via the VHF radio transceiver, the VHF band radio carrier signal with data to generate the transmitted VHF band radio modulated signals during transmission;
- during transmission, radiate, via the magnetic coupler, the transmitted VHF band radio modulated signals into the tissue of the user;
- during reception, absorb, via the magnetic coupler, the received VHF band radio modulated signals from the tissue of the user; and
- demodulate, via the VHF radio transceiver, the received VHF band radio modulated signals into data during reception.

18. The wearable device of claim 17, wherein:
the magnetic coupler includes a driven element;
the driven element connects to the diamagnetic material;
the diamagnetic material has a high magnetic permeability which is greater than 10 mu; and
the diamagnetic material is shaped to form a fraction of a toroid, polyhedron, ellipsoid, or other quadric surface with a hollow interior cavity.

19. The wearable device of claim 17, wherein:
the diamagnetic material includes ferrite;
the driven element includes a conductive coil which wraps around the ferrite; and
the ferrite is shaped to form a half toroid.

20. The wearable device of claim 17, wherein the VHF transmission or reception terminal extends through the magnetic coupler opening to contact the tissue of the user.

* * * * *